US007742426B2

(12) United States Patent
Schumacher et al.

(10) Patent No.: US 7,742,426 B2
(45) Date of Patent: Jun. 22, 2010

(54) SYSTEM, METHOD, AND COMPUTER-READABLE MEDIUM FOR DETERMINING A LAYER 2 PATH TRACE IN A HETEROGENEOUS NETWORK SYSTEM

(75) Inventors: Michael Tod Schumacher, Raleigh, NC (US); Jeffrey Todd Hicks, Cary, NC (US)

(73) Assignee: Netiq Corporation, San Jose, CA (US)

( * ) Notice: Subject to any disclaimer, the term of this patent is extended or adjusted under 35 U.S.C. 154(b) by 619 days.

(21) Appl. No.: 11/462,086

(22) Filed: Aug. 3, 2006

(65) Prior Publication Data
US 2007/0147261 A1 Jun. 28, 2007

Related U.S. Application Data

(60) Provisional application No. 60/754,373, filed on Dec. 27, 2005.

(51) Int. Cl.
*G01R 31/08* (2006.01)
(52) U.S. Cl. .................. 370/248; 370/392; 370/254; 370/390; 370/255; 370/256; 370/400; 370/401; 370/402; 370/403; 370/404; 370/331; 370/389; 370/410; 370/451
(58) Field of Classification Search ......... 370/351–356, 370/389, 392, 394, 395.52, 395.53; 709/223–224
See application file for complete search history.

(56) References Cited

U.S. PATENT DOCUMENTS

| 5,926,463 | A  | * | 7/1999 | Ahearn et al. | 370/254 |
| 6,538,997 | B1 | * | 3/2003 | Wang et al. | 370/241 |
| 2004/0066747 | A1 | * | 4/2004 | Jorgensen et al. | 370/241 |
| 2005/0099954 | A1 | * | 5/2005 | Mohan et al. | 370/241.1 |
| 2006/0013142 | A1 | * | 1/2006 | Hongal et al. | 370/248 |

* cited by examiner

*Primary Examiner*—Chi H Pham
*Assistant Examiner*—Kouroush Mohebbi
(74) *Attorney, Agent, or Firm*—Haynes and Boone, LLP

(57) ABSTRACT

A system, method, and computer-readable medium for performing network system diagnostics is provided. The method includes obtaining a respective identification of a first target device and a second target device deployed in a network; iteratively querying neighbor devices of at least one node in a communications path between the first and second target devices, wherein the neighbor devices and the first and second target device may comprise heterogeneous network nodes; and generating a layer 2 path trace that comprises identification of network devices interconnected on a physical path between the first and second target devices. A computer-readable medium includes instructions for execution by a processing system, wherein the instructions are configured to perform the foregoing method. A system includes a data processing system including a processor device for executing a diagnostics engine implemented as a set of computer-executable instructions configured to perform the foregoing method.

27 Claims, 13 Drawing Sheets

180a →   330

| MAC 330a | Port 330b | timestamp 330c |
|---|---|---|
| MAC:A | 01 | time1 |
| MAC:B | 02 | time2 |
| MAC:C | 05 | time3 |
| MAC:D | 06 | time4 |
| MAC:E | 07 | time5 |
| ⋮ | ⋮ | ⋮ |
| MAC:X | 10 | time6 |

320a — MAC:A
320b — MAC:B
320c — MAC:C
320d — MAC:D
320e — MAC:E
320z — MAC:X

| Port 380a | VLAN 380b |
|---|---|
| 01 | 1 |
| 02 | 2 |
| 05 | 3 |
| 06 | 1 |
| 07 | 3 |
| 08 | 1, 2 |
| ⋮ | ⋮ |
| 10 | 3 |

SYSTEM, METHOD, AND COMPUTER-READABLE MEDIUM FOR DETERMINING A LAYER 2 PATH TRACE IN A HETEROGENEOUS NETWORK SYSTEM

RELATED APPLICATION DATA

This patent application claims the benefit of the filing date of U.S. provisional Patent Application Ser. No. 60/754,373, filed Dec. 27, 2005, the disclosure of which is incorporated by reference.

CROSS-REFERENCE TO RELATED APPLICATIONS

The present application is a continuation-in-part of U.S. patent application Ser. No. 10/395,347, filed on Mar. 24, 2003, and published as U.S. Patent Publication No. 2004/0193709 A1, filed on Sep. 30, 2004, the disclosures of which are incorporated herein by reference.

BACKGROUND

Embodiments disclosed herein relate to, in general, network systems and, in particular, to network system diagnostics.

BRIEF DESCRIPTION OF FIGURES

Aspects of the present disclosure are best understood from the following detailed description when read with the accompanying figures, in which:

FIG. 3A is a diagrammatic representation of a port forwarding database that maps IP addresses of devices to MAC addresses;

FIG. 3B is a diagrammatic representation of a VLAN table;

DETAILED DESCRIPTION

Figure 1:
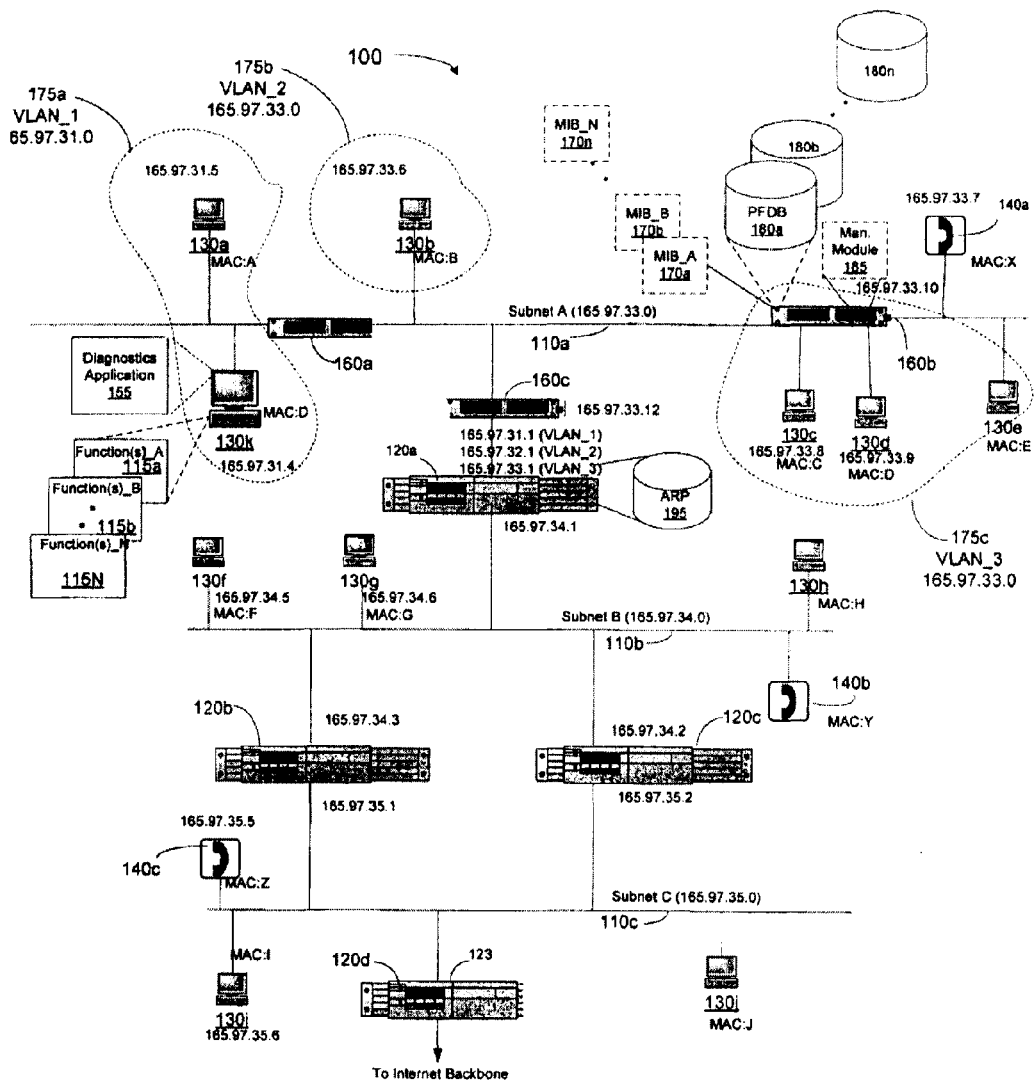
FIG. 1 is a diagrammatic representation of a network system in which an embodiment of the disclosure may be implemented for identifying a layer 2 path trace between target devices.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Over the last decade, the complexity of Layer 2 Ethernet topologies in local area networks has increased significantly with the proliferation of Ethernet Bridges, Switches, and virtual local area network technologies. However, a lack of standardization for how various Ethernet topologies may be discovered, monitored, and managed has lead to increased difficulty in identifying problems related to Layer 2 connectivity, performance, and security threats. Latency sensitive applications, such as voice over Internet Protocol (VoIP), streaming audio/video, and the like, pose particular diagnostic difficulties in the absence of network topology information.

FIG. 1 is a diagrammatic representation of a network system 100 in which embodiments of the disclosure may be implemented. FIG. 1 is intended as an example, and not as an architectural limitation, of embodiments described herein. Network system 100 comprises three network segments, identified as sub-networks or simply subnets 110a-110c with respective network numbers (subnet numbers) 165.97.33.0, 165.97.34.0 and 165.97.35.0. Subnets 110a-110c comprise physical media connecting two or more computers or other devices together. For example, subnets 110a-110c may comprise respective Ethernets, any shared media in which devices are addressed by a Media Address Control (most commonly Ethernet), or the like. A subnet number comprises a designated identifier associated with a network segment. Each subnet 110a-110c has a range of IP addresses allocated to various hosts connected to it, which are collectively referred to as a subnet IP address space. Network system 100 is made up by the various network segments interconnected by routers, switches, and the like. In the illustrative example, subnets 110a and 110b are interconnected by a router 120a, and subnets 110b and 110c are interconnected by routers 120b and 120c. Various subnets may be logically divided into one or more virtual local area networks (VLANs) as is known. In the present example, subnet 110 is configured with three VLANs 175a-175c each assigned to a separate subnet number. Network system 100 may be connected to external networks, such as the Internet, through a router 120d which may connect through a point-to-point link to an Internet service provider (ISP) router which further connects to the Internet backbone.

Network system 100 may include various host devices. In the illustrative example, network system 100 includes host computers 130a-130e connected with subnet 110a, host computers 130f-130h connected with subnet 110b, and host computers 130i-j connected with subnet 110c. Additionally, subnet 110a has a computer 130k configured as a management station adapted to perform diagnostics operations in accordance with embodiments disclosed herein. Computer 130k configured as a management station need not be deployed on a subnet (or within the same network system 100) in which layer 2 diagnostics are to be performed. Rather, computer 130k configured as a management station may be deployed external to network system 100 with access to network system 100, and diagnostics may be performed by computer 130k remotely. Depiction of computer 130k within network system 100 is for illustrative purposes only. System 100 may also have various voice-capable hosts, such as voice over IP (VoIP) terminal 140a connected with subnet 110a, VoIP terminal 140b connected with subnet 110b, and VoIP terminal 140c connected with subnet 110c.

Each device connected to one of subnets 110a-110c may have a logical, or layer 3, address assigned thereto such as an IP address. In the illustrative example, logical addresses are illustrated in dotted decimal notation. Every IP address assigned to a device on a network segment comprises two constituent parts: the network number part (most significant bits) and the host number part (least significant bits), such that the network number part is common to all IP addresses in a common network segment.

Additionally, each device connected with one of subnets 110a-110c has a physical, or layer 2, address assigned or associated therewith. In the illustrative example, each of computers 130a-130j have media access control (MAC) addresses of MAC:A-MAC:J, respectively, and VoIP terminals 140a-140c have MAC addresses of MAC:X-MAC:Z, respectively. A Media Access Control address is uniquely associated with the device hardware, e.g., a network interface card, connecting it to a network segment. The MAC address identifies the device address to the rest of the network segment. MAC addresses are typically implemented as a predefined length binary number, such as a 48-bit value. In the illustrative example, MAC addresses designated as alphabetic values are provided for illustrative purposes and are representative of binary physical addresses.

Subnets 110a-110c may include various network infrastructure components, such as switches, bridges, hubs, or the like. In the illustrative example, subnet 110a includes switches 160a-160c that may interconnect various other devices with subnet 110a. Each device connected with a switch may be connected therewith by straight-through cabling. For example, terminal 140a may be directly connected with switch 160b and may not share its network segment coupling with any other network entity. A layer 2 Ethernet physical connection may be running in either half-duplex or full-duplex mode. When configured in a half-duplex mode, the physical media may be shared by more than two devices. When configured in a full-duplex mode, only two devices are connected by a straight-through cable. Thus, subnets 110a-110c are each representative of any number of network mediums, such as 100baseT Ethernet cables.

Embodiments disclosed herein provide for the detection of whether media is running half or full duplex to facilitate the discovery of the layer 2 topology. Switches 160a-160c are assigned logical addresses, such as layer 3 addresses. Switch management port IP addresses may be in a different subnet as the devices connected thereto—a configuration referred to as out-of-band management. Such a switch management configuration allows for management access if a subnet is not functioning properly because the switch management is configured on a different subnet.

Switches 160a-160c may maintain a respective port forwarding database (PFDB) that maps network device physical addresses to physical switch ports. In the illustrative example, switch 160b includes a PFDB 180a and a corresponding management information base (MIB) 170a that provides an interface to PFDB 180a. Additionally, various other databases, tables, or other management data structures 180b-180n that respectively have an associated MIB 170b-170n may be maintained by switch 160b. Additionally, switch 160b may include a management module 185 that manages various management data that may be maintained in PFDBs 180a-180n. Management module 185 may comprise a standardized interface, such as an SNMP agent, or may be implemented as a proprietary interface supporting a proprietary command set. Management module 185 may have a layer 3 address assigned thereto. In the illustrative example, management module 185 has an IP address of 165.97.33.10 assigned thereto. Other switches, such as switches 160a and 160c, may include one or more PFDBs and corresponding interfaces, management modules, or the like.

As shown, routers 120a-120c may provide an interface to multiple subnets. Accordingly, routers 120a-120c may have a layer 3 address assigned to each subnet interface. For example, router 120a has an interface to subnet 110a and an interface to subnet 110b. The interface of router 120a to subnet 110a has an IP address of 165.97.33.1, and the interface of router 120a to subnet 110b has an IP address of 165.97.34.1. In a similar manner, the interface of router 120b to subnet 110b has an IP address of 165.97.34.3, and the interface of router 120b to subnet 110c has an IP address of 165.97.35.1. Likewise, the interface of router 120c to subnet 110b has an IP address of 165.97.34.2, and the interface of router 120c to subnet 110c has an IP address of 165.97.35.2. The use of a particular router interface depends on which connected subnet is sending the packets. For instance, when router 120a receives an IP packet through the interface 165.97.33.1, the packet should have been generated by a host in subnet 110a (or forwarded by another router connected to this subnet). Router 120a includes an address resolution protocol (ARP) table 195 that provides mapping of layer 3 and layer 2 addresses to facilitate identification of a host physical address from its IP address.

Network system 100 may be configured with virtual local area networks (VLANs). A VLAN comprises a logical grouping of two or more nodes which are not necessarily on the same physical network segment but which share the same IP network number. In the illustrative example, network system 100 is configured with VLANs 175a-175c (designated VLAN_1-VLAN_3). One of the VLANs, such as VLAN 175a, may be designated as a default VLAN. Any devices of a subnet not otherwise assigned to one of the VLANs will thereby be assigned to the default VLAN. Each of VLANs 175a-175c is assigned a respective subnet number (165.97.31.0, 165.97.32.0, and 165.97.33.0, respectively). With multiple VLANs in use, router interfaces are logically divided into sub-interfaces each having a different IP Address. For example, router 120a is configured with three sub-interface IP addresses (165.97.31.1, 165.97.32.1, and 165.97.33.1) each corresponding to one of the VLAN subnets. However, the router interface may advertise the same MAC address in each VLAN. Thus, it is possible for the same MAC address to appear in multiple VLANs. Implementations provided herein may account for this scenario by comparing MAC/VLAN pairings as a unique identifier until a MAC/VLAN pair matching one identified in a layer 2 path trace is identified.

Figure 2A:
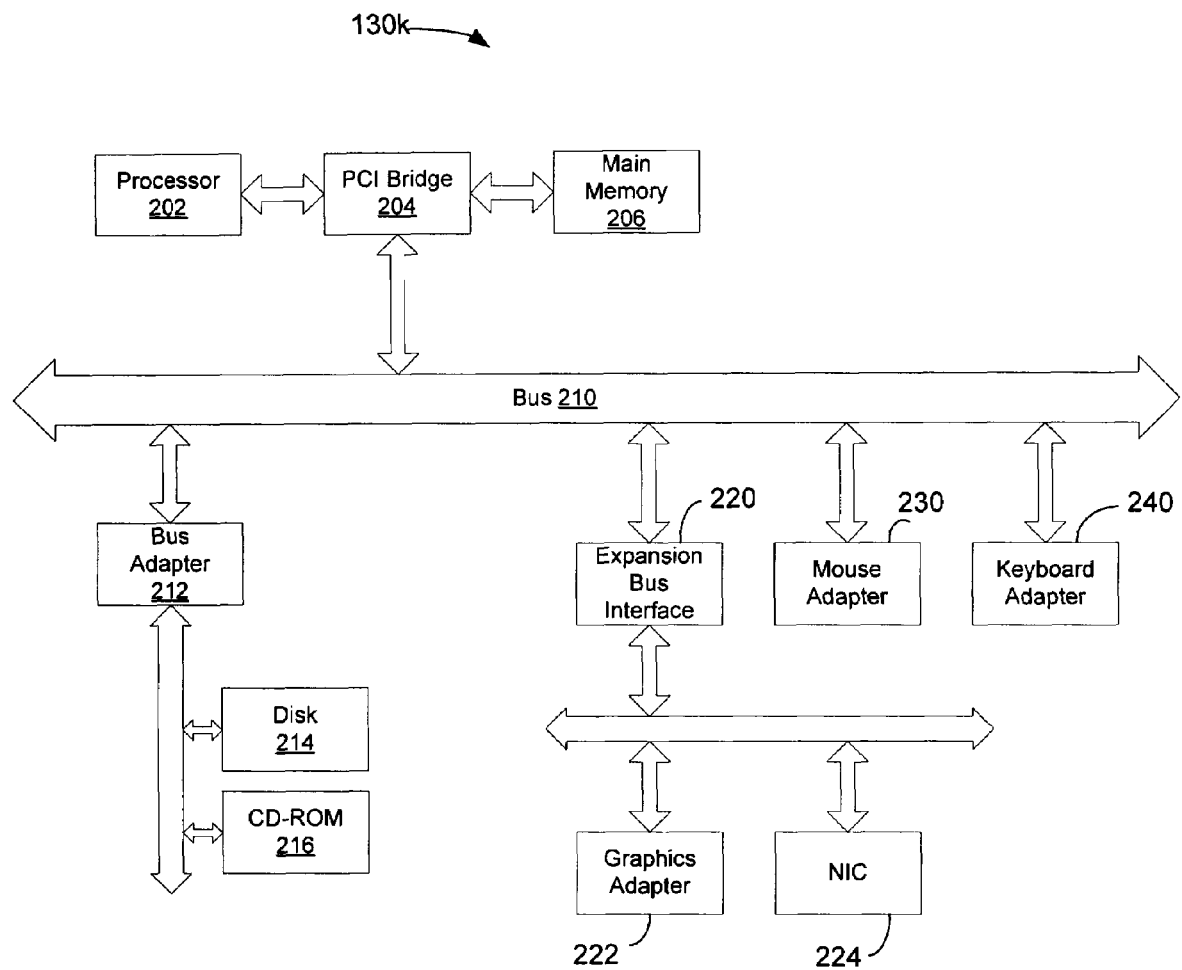
FIG. 2A is a diagrammatic representation of a computer system that may be configured as a management station adapted to perform diagnostics operations in accordance with embodiments disclosed herein.

FIG. 2A is a diagrammatic representation of computer system 130k depicted in FIG. 1 that may be configured as a management station adapted to perform diagnostics operations in accordance with embodiments disclosed herein.

Code or instructions implementing an embodiment of a diagnostics application disclosed herein may be located or accessed by system 130k. In the illustrative example, system 130k employs a PCI local bus architecture, although other bus architectures, such as the Industry Standard Architecture (ISA), may be used. A processor system 202 and a main memory 206 may be connected to a PCI local bus 210 through a PCI bridge 204. PCI bridge 204 also may include an integrated memory controller and cache memory for processor system 202. Additional connections to PCI local bus 210 may be made through direct component interconnection or through add-in connectors. In the depicted example, a small computer system interface (SCSI) host bus adapter 212, an expansion bus interface 220, a mouse adapter 230, and a keyboard adapter 240 are connected to PCI local bus 210 by direct component connection. Expansion bus interface 220 provides a connection for various peripheral devices. A graphics adapter 222 and a network interface card (NIC) 224 are connected to PCI local bus 210 via expansion bus interface 220 by add-in boards inserted into expansion slots. NIC 224 provides an interface for communicatively coupling system 130k with other devices in system 100 depicted in FIG. 1. SCSI host bus adapter 212 provides a connection for a hard disk drive 214, and a CD-ROM drive 216. Typical PCI local bus implementations may support a plurality of PCI expansion slots or add-in connectors.

An operating system runs on processor system 202 and is used to coordinate and provide control of various components within system 130k. Instructions for the operating system and applications or programs are located on storage devices, such as hard disk drive 214, and may be loaded into main memory 206 for execution by processor system 202.

In accordance with embodiments disclosed herein, a diagnostics application may be run on system 130k and may provide an interface for submission of target devices for which a layer 2 path trace is to be performed. The diagnostics application may include various subroutines or processing modules that collect target device identities and known network configuration data, populate port forwarding databases of switches in the network, perform various path trace actions on layer 2 devices, evaluate switches that have been identified as possibly located in a layer 2 path between the target devices, identify a device order of layer 2 devices identified as included in a layer 2 path between the target devices, assemble a layer 2 path trace from identified node order data, and generate a user interface that provides a graphical presentation of a layer 2 path trace between the target devices. Communication connections between system 130k and various network entities may be made, for example, on the TCP/IP protocol suite, although other communication protocols may be suitably substituted therefor. Implementations of disclosed embodiments are not limited to any particular protocol and those described are provided only to facilitate an understanding of the embodiments.

Figure 2B:
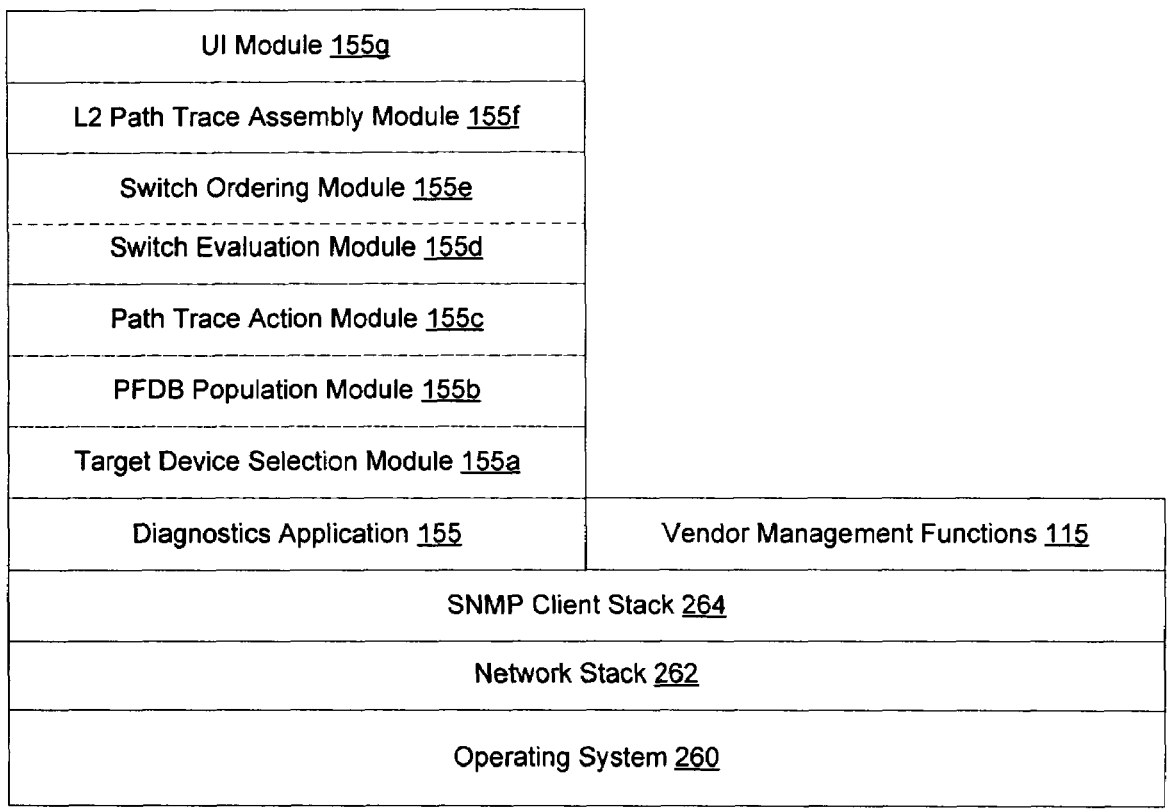
FIG. 2B is a diagrammatic representation of an embodiment of a software configuration of the computer system depicted in FIG. 2A that facilitates performing diagnostic operations.

FIG. 2B is a diagrammatic representation of an embodiment of a software configuration 250 of computer system 130k depicted in FIGS. 1 and 2A that facilitates performing diagnostic operations. Configuration 250 includes an operating system 260 that manages execution of a network stack 262 that provides for network communications. For example, network stack 262 may be implemented as a transmission control protocol/Internet protocol (TCP/IP) stack. An SNMP client stack 264, such as net-snmp, may be deployed and run on network stack 262 that facilitates execution of get and getNext operations. Diagnostics application 155 may include various functional modules 155a-155g that may be implemented as instruction sets, subroutines, or other executable code.

In the illustrative example, diagnostics application 155 may include a target device selection module 155a that includes logic or executable instructions for receiving target device identities, e.g., network addresses of target devices, phone numbers of target devices, network names assigned to the target devices, or other suitable data that may be used to identify the target devices within system 100. Target device selection module 155a may also include logic for receiving address information of management entities, such as management modules of layer 2 devices, deployed on system 100.

PFDB population module 155b may include executable instructions for populating PFDBs maintained or otherwise interfaced by network devices deployed in system 100. To this end, PFDB population module 155b may include logic for forcing a target device to exchange a packet or other data structure with a peer device if the target devices are located on a common subnet, pinging the target devices from a host external to the subnets of the target devices if the target devices are located on different subnets, or other procedures that facilitate PFDB population. Additionally, PFDB population module 155b may implement layer 3 diagnostics for performing a layer 3 trace route for identifying layer 3 devices, if any, located between the target devices. Alternatively, layer 3 diagnostics may be implemented in a separate module of diagnostics application 155.

Path trace action module 155c may include executable instructions for performing various actions on particular layer 2 devices that may be included in a layer 2 path trace between the target devices. For example, path trace action module 155c may perform device discovery actions to obtain various characteristics of a layer 2 device, such as a device vendor or manufacturer, device configuration, and other information related to the layer 2 device. Additionally, path trace action module 155c may, among other actions, interrogate physical neighbors of a particular layer 2 device, query PFDBs and port status of layer 2 devices, and obtain VLAN information of layer 2 devices.

Switch evaluation module 155d may include executable instructions for evaluating switches identified as possibly included in a layer 2 path trace between the target devices. To this end, switch evaluation module 155d may retrieve PFDB data of a layer 2 switch and perform various switch evaluations in an attempt to designate the switch as included or excluded from the layer 2 path trace between the target devices.

Switch ordering module 155e may include executable instructions for attempting to determine device connectivity ordering of devices that have been identified as possibly included in a layer 2 path trace between the target devices. To this end, switch ordering module 155e may retrieve PFDB data of a layer 2 switch and evaluate various target device characteristics with, for example, characteristics of other devices to determine connectivity information of layer 2 switches, layer 3 routers, and target devices.

L2 path trace assembly module 155f may include executable instructions for assembling device connectivity information obtained from switch ordering module 155e into a layer 2 path trace. To this end, L2 path trace assembly module 155f may evaluate physical connectivity information of various network nodes, evaluate the connectivity of ordered nodes with other devices that have not been ordered in an attempt to identify additional node orderings, and designate each device identified as included in a layer 2 path trace between the target devices as ordered or unordered.

A user interface (UI) module 155g may include executable instructions for generating a user interface that may be displayed on an output device, such as a monitor. To this end, L2 path trace assembly module 155f may generate graphical objects representative of network nodes, connectivity information, and the like and produce a displayable image representative of the layer 2 path trace. Additionally, UI module 155g may produce visual output that distinguishes ordered nodes from unordered nodes to facilitate interpretation of the graphical layer 2 path trace output.

Application 155 may include or interface with a library of various vendor management functions 115, such as SynOptics Network Management Protocol (SONMP) functions, Cisco Discovery Protocol (CDP) and Foundry Discovery Protocol (FDP) functions, or proprietary formatted management functions or methods. Management functions 115 may also comprise generic management functions, such as SNMP functions, that are standardized and supported by network components of various manufacturers.

FIG. 3A is a diagrammatic representation of port forwarding database 180a shown in FIG. 1 that maps IP addresses of devices to MAC addresses. Database 180a may be implemented as a lookup table comprising a plurality of records 320 and fields 330. Database 180a may be stored in a storage medium, such as a random access memory, dynamic random access memory, or the like, of switch 160b. Each record 320a-320z, or row, comprises associated data elements in respective fields 330a-330c.

In the present example, field 330a stores physical addresses of devices on the subnet in which the host switch maintaining database 180a is deployed. Thus, for example, field 330a stores various MAC addresses of devices deployed on subnet 110a. Field 330b stores network port identities of physical ports to which a device with a MAC address specified in a common record is coupled. For example, field 330b of record 320a indicates a port "01" of switch 160b to which the device (computer 130a in the present example) having MAC address "A" is connected. Field 330c comprises a timestamp field and may indicate a time at which the associated record was last updated or was entered in database 180a. Switch 160b may be configured to dynamically remove entries in database 180a if they have not been used for a particular interval, e.g., 5 minutes.

Database 180a may be manually configured or automatically configured. For example, a network administrator may manually install device MAC and port information in database 180a of switch 160b. Alternatively, the switch may be configured with transparent bridging functionality for automatically populating the port forwarding database.

FIG. 3B is a diagrammatic representation of a data structure 180b that comprises a VLAN table maintained by switch 160b that maps port numbers to one or more VLAN numbers. Data structure 180b may be implemented as a lookup table comprising a plurality of records 370 and fields 380. Database 180b may be stored in a storage medium of switch 160b.

In the present example, field 380a stores port numbers and field 380b stores corresponding VLAN identities to which a device connected on the corresponding switch port is assigned. For example, field 380b of record 370a indicates a port "01" is coupled with a device assigned to VLAN "1". Ports, such as port "08," having multiple VLANs assigned thereto are referred to as VLAN trunks.

Switched network technologies greatly facilitate network scalability. However, as networks grow in size, it may be difficult to determine the particular network infrastructure, e.g., the node connectivity of the network system. As VoIP technologies become increasingly common, problems with system performance may be difficult to determine or isolate due to the complexity of the network. Embodiments disclosed herein provide mechanisms that facilitate determining a node-to-node layer 2 path between two particular network nodes.

In accordance with an embodiment, nodes in a path interconnecting two specified network devices are determined as part of an identified path. Nodes in an identified path may be characterized as "unordered node" or "ordered node." An unordered node comprises a node for which both physical ports of the device used to pass traffic for the layer 2 path between the target devices and for which the identity of the device at the other end of either physical connection is unknown. An ordered node comprises a node for which both physical ports of the device used to pass traffic for the layer 2 path between the target devices are known and the identity of at least one device at the other end of either physical connection is known.

Likewise, a path may be classified as unordered or ordered. An ordered path comprises a path of nodes between two network devices in which all nodes of the path are identified (including each node's connectivity). That is, an ordered path specifies the complete connectivity of nodes interconnecting two network devices. An unordered path may include an identifier of each node in the path and include at least one node that is unordered, or an unordered path may include nodes that are not identified. Of course, optimally, an ordered path will result by implementation of embodiments disclosed herein. However, due to varieties in management data available at particular network nodes, an unordered path may result from implementations of the embodiments disclosed herein.

Implementations of the disclosure provide mechanisms for retrieving available management data to identify and query layer 2 switches from both standardized and proprietary management information sources. Data gathering is driven by diagnostic rules in an expert system to efficiently prioritize, coordinate, and throttle various concurrent activities. Data correlation and logical deduction are used to discover additional layer 2 switches in a network system that may be included in a node path. Available data is examined to identify switches which are known to pass packets between the two devices terminating a path, ingress/egress ports for each identified switch, and any associated VLAN and physical connectivity between switch ports. A path, possibly ordered or unordered, is assembled based on the collected and evaluated data and depending on the management data available. The assembled path may be graphically represented and displayed to a user of a diagnostics application implemented in accordance with embodiments disclosed herein.

In accordance with an embodiment, a diagnostics application 155 run by management station 130k may include a diagnostics client, such as a simple network management protocol (SNMP) client, adapted to issue requests for management operations. Additionally, client 155 may receive traps from node agents as well. Node agents may be incorporated in, for example, switch management modules, such as management module 185.

Diagnostics application 155 optimally identifies and displays a graphical representation of a physical path of interconnected switch ports that form a path between two specified network devices (also referred to herein as target devices), such as VoIP terminals. Additionally, application 155 may also identify VLAN information related to the target devices.

If the target devices are deployed on different subnets, data traffic therebetween will pass through a Layer 3 Router, e.g., one or more of routers 120a-120c. Accordingly, multiple layer 2 traces are necessary to provide a composite trace between the target devices. For example, assume a layer 2 trace is to be performed by application 155 on target devices specified as VoIP terminals 140a and 140c. To obtain a layer 2 path trace, application 155 must perform a layer 2 trace from terminal 140a to router 120a, a layer 2 trace from router 120a to one of routers 120b and 120c, and from one of routers 120b and 120c to VoIP terminal 140c. Thus, a layer 2 trace between target devices specified as terminals 140a and 140c would comprise 3 constituent layer 2 trace segments.

If data traffic between the target devices does not pass through a Layer 3 router, that is the target devices are deployed on a common subnet, a single layer 2 trace may be performed to identify the layer 2 path between the target devices.

In some scenarios, a complete layer 2 trace may not be identified by application 155. In accordance with embodiments herein, any layer 2 trace data of an incomplete layer 2 trace may be graphically represented. For example, application 155 may generate a list type format showing switch ports which have been passing traffic between the target devices.

In accordance with an embodiment, application 155 may perform a layer 2 trace in a heterogeneous network environment that includes network infrastructure, such as routers, switches, bridges, and the like, produced by any number of manufacturers. To this end, application 155 may include or interface with a library of various vendor management functions 115a-115N. For example, vendor management function 115a may comprise SynOptics Network Management Protocol (SONMP) methods that may be invoked for gathering management data on network components produced by a particular manufacturer, e.g., Nortel Networks, while management function 115b may comprise management functions comprising proprietary formatted management functions or methods for network components manufactured by another manufacturer. Other vendor management functions, such as Cisco Discovery Protocol (CDP) and Foundry Discovery Protocol (FDP), may be included that conform to other manufacturer's devices. Other management functions, such as management function 115N, may comprise generic management functions, such as SNMP functions, that are standardized and supported by network components of various manufacturers.

PFDBs 180a-180n may be populated by the host devices, i.e., switch 160b, by interacting with physically connected neighbor switches, such as switches 160a and 160c, or other network components. In the event that each device of a layer 2 path trace supports a standardized management information base and assuming application 155 is configured with the appropriate management function(s) to interface with the MIBs, it is possible to automatically identify management IP address of physically neighboring layer 2 devices. Accordingly, given any starting point of a desired layer 2 trace, such as a target device, a gateway router, or any Layer 2 switch that is part of the complete path trace, it is possible to determine the management IP addresses of neighboring devices, access their MIBs, and sequence though neighboring nodes of the path to obtain path trace segments that may be assembled into a composite layer 2 trace spanning the target devices.

However, various network management protocols, such as SONMP and Cisco Discovery Protocol (CDP), are not interoperable and thereby prohibit a purely proprietary automation of a layer 2 path trace in a heterogeneous network environment that includes various interconnected network components of different manufactures. For example, a network device that supports CDP may not recognize a query in SONMP and the device may pass SONMP traffic as any other packet. In another scenario, a CDP device may simply drop any SONMP traffic. In either scenario, a layer 2 path trace may be halted if carried out purely in proprietary fashion in a heterogeneous network.

In accordance with embodiments disclosed herein, if a layer 2 path trace being conducted by application 155 is halted, e.g., due to issuance of a proprietary management call issued to a non-supporting device, additional parts of the path may be determined by examining generic data in, for example, a Port Forwarding Database and port configuration data in a layer 2 switch assuming management IP addresses of the Layer 2 devices are known or may be discovered. Diagnostic rules may be applied that allow a determination that a switch is part of a path trace. In some instances, a device identified in such a manner may be further evaluated for the device order, that is the device position within the path trace.

In the event that one or more management IP addresses of Layer 2 device(s) in the path trace may not be determined through invocation of proprietary management functions, e.g., through calls to one or more of functions 115a-115n, application 155 may prompt a user for manual configuration of one or more layer 2 device data. For example, application 155 may be provided with a list of management IP addresses of Layer 2 devices in the subnet of a target device. Alternatively, or in addition thereto, application 155 may be provided with a list of physical interconnections identifying neighbor Layer 2 Devices and ports thereof that are mutually interconnected.

By providing optional implementation of proprietary management tracing functions, switch PFDB/port analysis, and user supplied configuration, application 155 is adapted, under most scenarios, to perform a complete Layer 2 path trace. If the layer 2 trace is incomplete, a path trace displayed in a graphical user interface of application 155 may identify what information is lacking, i.e., by identifying breaks in the path trace thereby providing the user an opportunity to manually determine the missing information thereby enabling manual configuration of an unidentified network component for future diagnostic evaluations.

In general, embodiments disclosed herein provide a mechanism for selecting two target devices interconnected by one or more network nodes for which a layer 2 path trace may be performed. The mechanism for selecting two target devices may be manual, e.g., a user may specify the target devices, or programmatic, e.g., an application may input or specify the target devices. Programmatic target device selection may be facilitated by a monitoring system that detects poor call quality and invokes a diagnosis tool or application in response to detection of the poor call quality. In this implementation, the devices identified as terminating the call for which poor quality has been identified may be selected as the target devices. The target devices and interconnecting nodes may be heterogeneous, that is nodes in the layer 2 path trace including the target devices may comprise nodes of various manufacturers. The identification of the target devices may be accompanied by supply of any known management and switch/port interconnection information. A PFDB population module may then be invoked to populate PFDBs of switches in the system such that the port forwarding databases contain up-to-date physical address and port mappings. A layer 3 path trace may be run as part of the PFDB population module. A path trace action module may be invoked to collect data, e.g., device, device type, vendor, configuration, physical addresses maintained in switch PFDBs, physical address-to-switch port configuration data, and the like, of nodes that may be included in a layer 2 path trace of the target devices. Once the path trace action module collects the requisite node data, a layer 2 switch evaluation module may be run to evaluate whether identified layer 2 switches are included in the layer 2 path trace. A switch ordering module may then be run to identify the connectivity order of routers/switches in the layer 2 path trace of the target devices. A layer 2 path trace assembly module may then be run to assemble the accumulated connectivity information to produce a layer 2 path trace. The layer 2 path trace may include ordered and unordered nodes, and a graphical representation of the layer 2 path trace may then be presented to the user.

Figure 4:
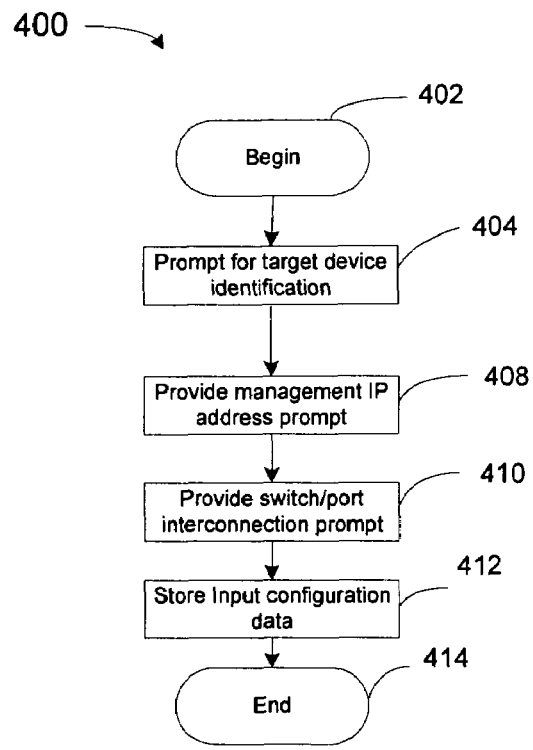
FIG. 4 is a flowchart depicting processing steps of an embodiment of a target device selection module that may be performed by a layer 2 diagnostics application to facilitate a layer 2 trace between two target devices.

FIG. 4 is a flowchart 400 depicting processing steps of an embodiment of target device selection module 155a that may be performed by layer 2 diagnostics application 155 shown in FIG. 1 to facilitate a layer 2 trace between two target devices. The target device selection module begins, at step 402, on invocation of application 155. At step 404, module 155a may provide a prompt for identification data of the two target devices for which a layer 2 path trace is to be performed if target device selection is provided manually. For example, a prompt may be provided to request supply of each target device's IP address or phone number. The MAC address and subnet number of the target devices may then be automatically determined or, alternatively, a prompt may be optionally provided for user input of the MAC address and subnet number. Alternatively, a programmatic selection of the target devices may be made at step 404 based on, for example, detection of poor call quality between two devices. Additionally at step 408, an optional prompt may be provided for any known management IP addresses of layer 2 devices known to be anywhere in the desired layer 2 path trace. At step 410, an optional prompt for any known switch/port interconnection data may also be provided. For example, two IP addresses of two interconnected devices in the path and corresponding connecting ports may be supplied by the user, if known. The supplied configuration data may then be stored, at step 412, and the target device selection module cycle may then end at step 414.

Figure 5:
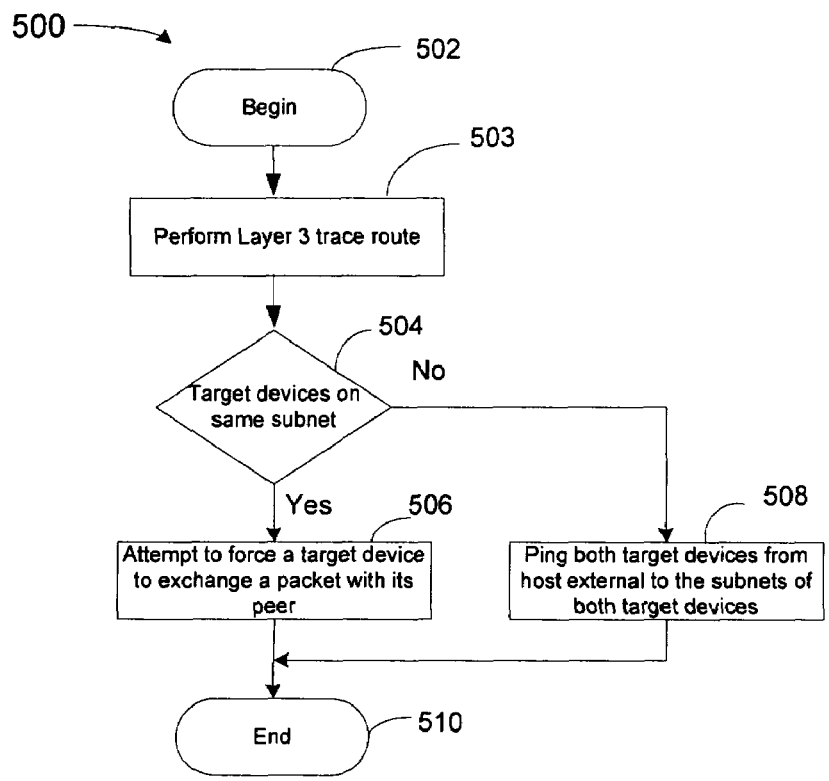
FIG. 5 is a flowchart depicting an embodiment of a port forwarding database population module of a diagnostics application that may be invoked after supply of target device and network configuration data by a user.

FIG. 5 is a flowchart 500 depicting processing steps of an embodiment of port forwarding database population module 155b that may be invoked after supply of target device and network configuration data by the user. At step 502, the PFDB population module may be invoked upon completion of the target device selection module depicted in FIG. 4. A layer 3 trace route may be performed, at step 503, which provides the layer 3 path (and necessary context) for performing a layer 2 path trace. The layer 3 trace route identifies any layer 3 devices disposed in a physical path between the target devices. In the present example, the layer 3 trace route may identify router 120a and router 120b and/or router 120c as located in the physical path between target devices 140a and 140c. The layer 3 trace route may be performed, for example, using the TCP/IP traceroute utility.

At step 504, an evaluation may be made to determine if both target devices are on the same subnet. If both target devices are identified as located on a common subnet, an attempt to force one of the target devices to exchange a packet, or other suitable data structure, with the other target device may be made at step 506. By forcing a target device to transmit a packet or other data to its peer target device, any PFDBs of layer 2 devices disposed in the layer 2 path between the target devices will be populated with port configuration data relative to the data exchange. The port forwarding database population module cycle may then end at step 510. If it is determined at step 504 that the target devices are located on different subnets, each target device may be pinged to populate the PFDBs with the correct path to the Gateway Router at step 508. For example, diagnostics application 155 may invoke a remote host external to the subnets of both target devices to ping each of the target devices. Pinging a target device from a host external to the subnet of the target device will result in the PFDB in a path from the target device to the gateway router of the target device's subnet being populated. If diagnostic application 155 is run by a host external to the subnets of the target devices, the ping operation may be performed by application 155. Optionally, an attempt to force one of the target devices to send a packet to its peer, as described in step 506, may be made in conjunction with, or in lieu of, the target device ping operation. Thereafter, the port forwarding database population module cycle may end according to step 510.

Figure 6:
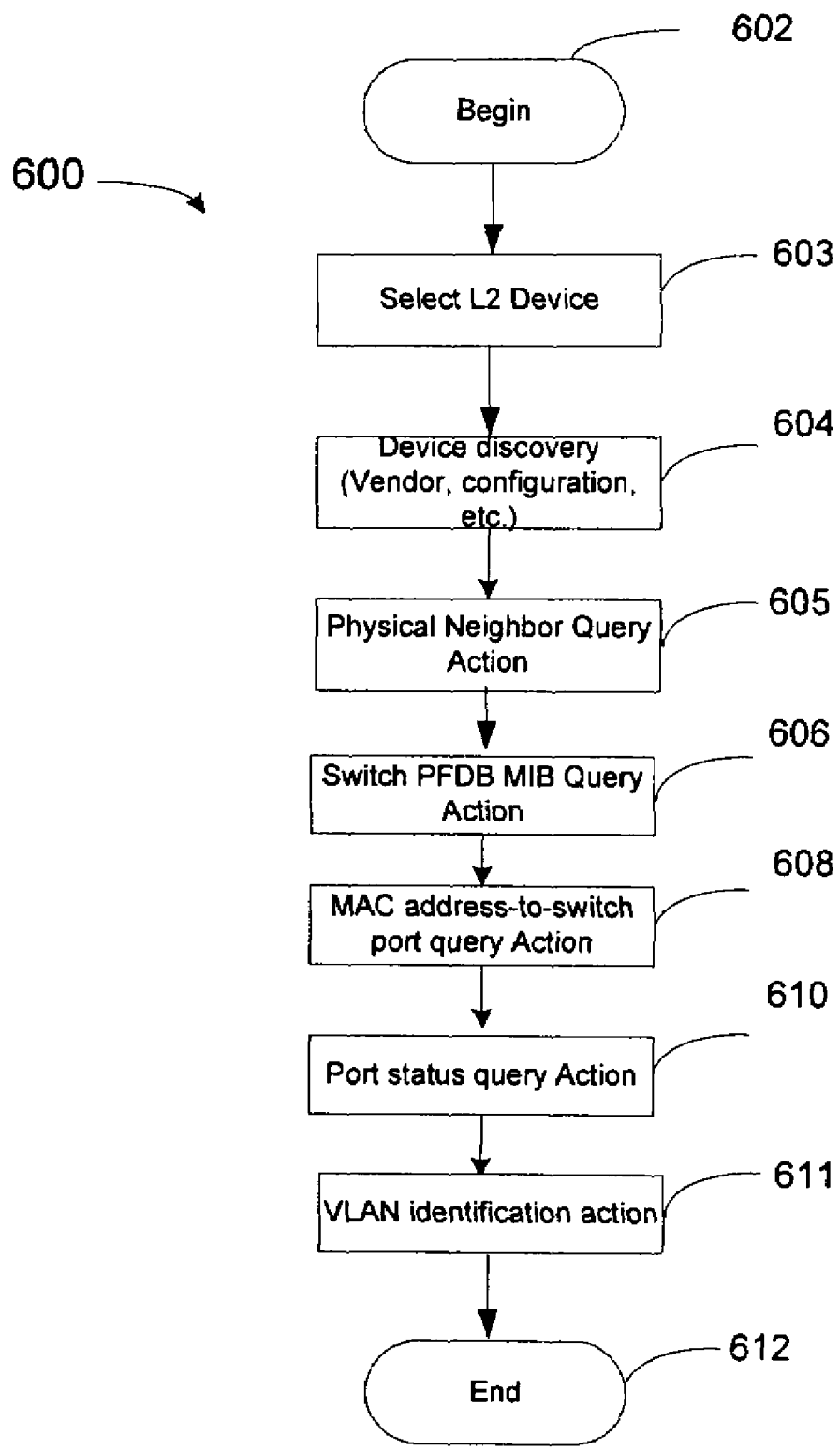
FIG. 6 is a flowchart depicting an embodiment of a path trace action module of a diagnostics application that may be invoked to facilitate identification of a layer 2 path trace.

The subnets, and devices thereon, may then be evaluated. Particularly, various mechanisms for obtaining information regarding layer 2 devices, such as switches, bridges, hubs, or other layer 2 infrastructure, may be implemented. FIG. 6 is a flowchart 600 depicting processing steps of an embodiment of a path trace action module 155c that may be invoked to facilitate identification of a layer 2 path trace. The path trace action module processing steps of FIG. 6 may be performed after the optional execution of the port forwarding database population module depicted in FIG. 5. Alternatively, the PFDB population module depicted in FIG. 5 may be implemented as an action in the path trace action module. Each action depicted in flowchart 600 may be implemented by respective SNMP queries, by other standardized network management protocol queries, by way of proprietary network management protocol queries, or by a combination thereof.

At step 602, the path trace action module may be invoked, for example, upon a command supplied to application 155 by a user. A layer 2 device is then selected, at step 602, and a device discovery action may be performed on the selected device, at step 604, to identify general information of the device, such as the device type, vendor, configuration, and the like. A physical neighbor query action may be performed to identify any neighbor devices of the selected layer 2 device at step 605. The physical neighbor query action may be implemented as a proprietary management command, such as CDP or SONMP, carried over a standardized protocol, such as SNMP. The physical neighbor query action may be executed on any layer 2 device that runs an SNMP agent that contains port forwarding database data that may be interfaced with a proprietary management function, e.g., CDP or SONMP, and that is directly connected with the selected layer 2 device. The node order in the path trace to which the SNMP query is issued does not effect the diagnostics of the path trace. Rather, knowledge engine rules may be employed to assemble collected data into a path trace dynamically regardless of the node order in which layer 2 devices are queried or evaluated. Thus, collection of path trace information may be initiated at an arbitrary node.

A Switch PFDB MIB Query Action may be performed on the selected layer 2 device to obtain a list of MAC addresses maintained in a MIB of the selected device at step 606. Results returned from a switch PFDB MIB query action may comprise assigned physical switch port and corresponding MAC address information. VLAN identification information may be returned as well. The switch PFDB MIB query action may be implemented as one or more Get queries on the PFDB for each MAC address. The number of queries necessary is dependent on the device vendor and whether VLANs are in use. An iterative query of VLAN tables maintained by the queried device may be necessary.

At step 608, a MAC address-to-switch port query action may be performed to query a switch PFDB MIB for discovery of switch-to-port information, such as a target device's MAC address-to-port mapping, the existence of a list of MAC addresses all assigned to the same physical switch port and, if applicable, any VLAN information. The switch port query action may provide, for example, node connectivity information to a queried switch where the node connectivity information indicates the node is connected to the queried switch by way of one or more intervening switches, hubs, bridges, or the like. Additionally, this action is preferably configured to return a Boolean value indicating if the list of MAC addresses are the only recorded MAC addresses assigned to the switch port.

A port status query action may be performed, at step 610, to determine the physical status of a switch port, i.e., whether the port is operational or disabled. Additionally, the port status query action may identify whether the port is running in Full-Duplex or Half-Duplex mode. At step 611, a VLAN identification action may then be performed to identify the VLAN to port assignment. The path trace action module cycle may then end according to step 612.

The actions, or a subset thereof, depicted in FIG. 6 may be performed on one or more nodes in system 100 to facilitate information collection of one or more nodes that may be included in the layer 2 path of the target devices, and the processing steps of FIG. 6 may be repeated on any number of layer 2 devices. Moreover, the starting point, i.e., the particular layer 2 device, on which one or more processing steps of FIG. 6 are first invoked may vary depending on any number of factors, including the operator's choice, known layer 2 device, if any, in the layer 2 path trace, the configuration of layer 2 devices directly connected with any layer 3 devices in the physical path between the target devices, design choice of the diagnostics application, or any number of other factors. For example, in one embodiment, the path trace action module may first be invoked on switch 160c identified as directly connected with layer 3 router 120a identified in the physical path of the target device. The path trace action module may then be performed on other layer 2 devices directly connected with switch 160c or router 120a. The path trace action module processes, or a subset thereof, may be repeatedly invoked on any layer 2 devices determined to be directly connected with a previously evaluated layer 2 device. Layer 2 devices known to be deployed in the physical path of the target devices may similarly be evaluated by the path trace action module. In general, the order of nodes on which the path trace action module is invoked is immaterial with regard to the functionality of diagnostics application 155.

In one embodiment, the path trace action module may be run on any layer 2 devices known to be in the path trace, any layer 2 devices directly connected with layer 2 devices known to be in the path trace, any layer 2 devices directly connected with any layer 3 devices identified in the layer 3 path trace, and/or any layer 2 devices identified as neighbor devices of evaluated layer 2 devices. In another embodiment, a subnet scan may be invoked on any subnets on which a target device is deployed or any intermediate subnets identified as included in the layer 2 path to potentially identify all layer 2 devices of the subnets. The path trace action module then may be invoked on all layer 2 devices. However, this embodiment may consume extensive processing times depending on the size of the network.

Additionally, as noted above, a subset of the processes of the path trace action module may be run on a layer 2 device. For instance, assume that the path trace action module has evaluated switch 160a as directly connected with switch 160c. Once the path trace action module runs the switch PFDB MIB query action and determines that neither the MAC address of target device 140a or 140c are included in the PBDB, no further processing is necessary to be performed by the path trace action module on the currently selected L2 device, and the path trace action module may proceed to evaluate another layer 2 device or complete its evaluation cycle.

Figure 7:
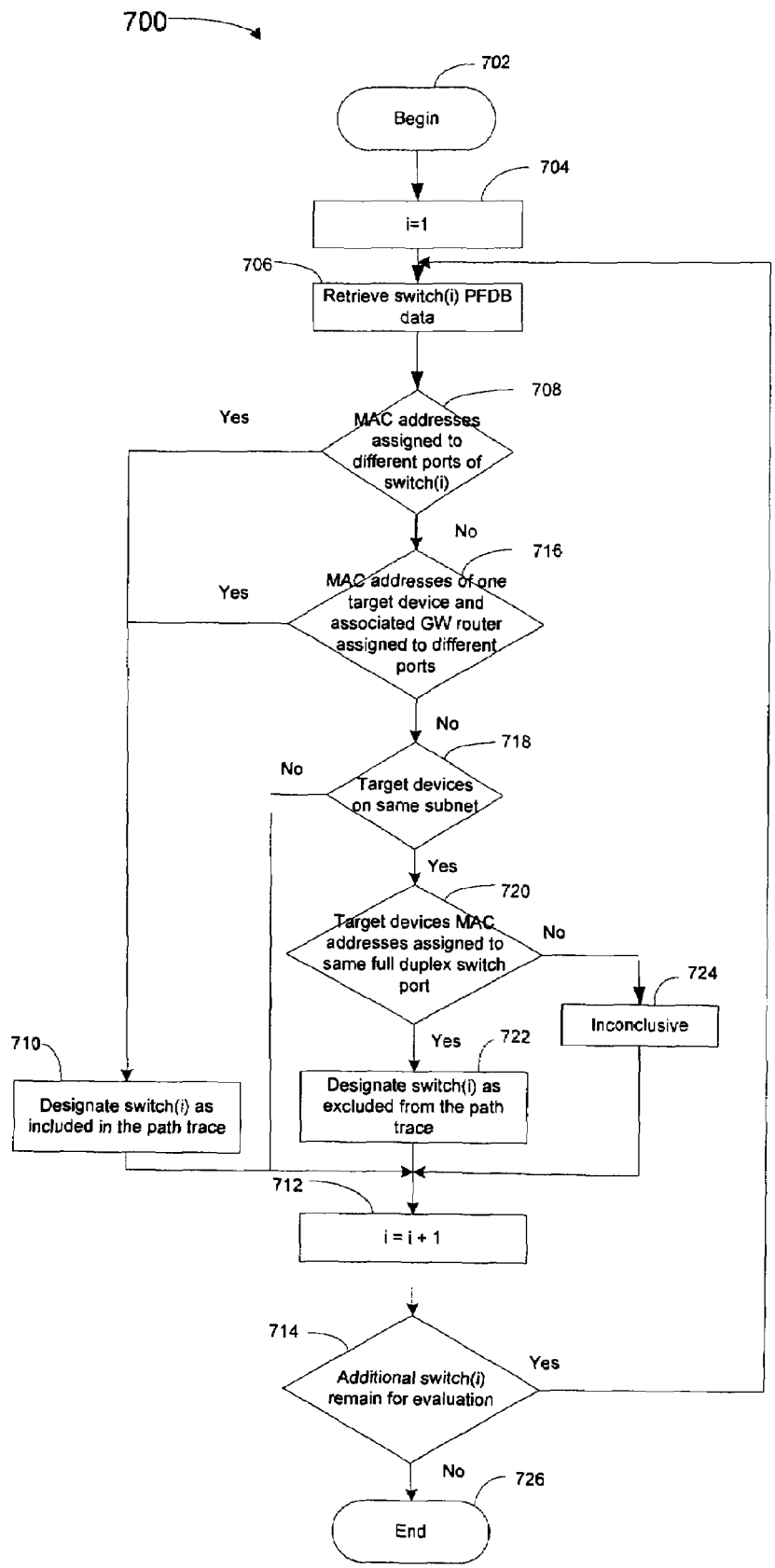
FIG. 7 is a flowchart depicting an embodiment of a layer 2 switch evaluation module of a diagnostics application that facilitates determination of whether a layer 2 switch is located in a path between two target devices.

FIG. 7 is a flowchart 700 depicting processing steps of an embodiment of a layer 2 switch evaluation module of diagnostic application 155 that facilitates determination of whether a layer 2 switch is located in a path between two target devices.

The layer 2 switch evaluation module is invoked, at step 702, and a switch index variable i may be initialized at step 704. PFDB data of switch(i), for example PFDB data collected in step 606 depicted in FIG. 6, is retrieved at step 706, and an evaluation of the retrieved PFDB data is made to determine if switch(i) has both MAC addresses of the target devices assigned to different ports of switch(i) according to step 708. In the event that switch(i) has the MAC addresses of both target devices assigned to different ports, the switch evaluation module may designate switch(i) as included in the path trace at step 710 since both target devices have been identified as having separate ingress ports on the switch. The switch evaluation module cycle may then increment the switch index variable according to step 712 and evaluate whether an additional switch remains for evaluation at step 714.

Returning again to step 708, in the event that the MAC addresses of both target devices are not assigned to different ports of switch(i), an evaluation may be made to determine if one of the target devices MAC address and the MAC address of the target device's gateway router or other layer 3 device are assigned to different ports of switch(i) according to step 716. If the MAC address of one of the target devices and the MAC address of an associated gateway router or other layer 3 device designated as included in the layer 3 path trace are both assigned to different ports of switch(i), the switch evaluation module may designate switch(i) as included in the path trace according to step 710. For example, consider a path trace having computer 130b and device 140c designated as a target devices. A layer 3 path trace, as performed according to step 503 of FIG. 5, would result in identification of router 120a as a layer 3 device in the physical path of the target devices. An evaluation of a PDFB of switch 160c in accordance with step 716 would result in identification of the MAC address-port assignment of a single target device, namely computer 130b, and a MAC address-port assignment of router 120a. Thus, in this instance, switch 160c would be designated as included in the layer 2 path trace according to step 710.

Returning again to step 716, in the event that the MAC address of one of the target devices and the MAC address of its associated gateway router are not assigned to different ports on switch(i), an evaluation may be made, at step 718, to determine if both target devices are located on the same subnet, e.g., by comparing the network portion of the target devices' IP addresses. If the target devices are not identified as located on a common subnet, the switch evaluation module may then proceed to increment the switch index variable according to step 712. If both target devices are identified as located on a common subnet at step 718, an evaluation may be made, at step 720, to determine if the MAC addresses of both target devices are assigned to the same full duplex switch port. The switch evaluation module may designate switch(i)

as excluded from the path trace, at step 722, in the event that the MAC addresses of both target devices are assigned to a common full duplex switch port, and processing may proceed to increment the switch index variable according to step 712. In the event that the MAC addresses of both target devices are not assigned to the same full duplex switch port, the switch evaluation module may evaluate the switch as inconclusive at step 724, and may proceed to increment the switch index counter according to step 712. The switch evaluation module may exit when all switches have been evaluated according to step 726.

Figure 8:
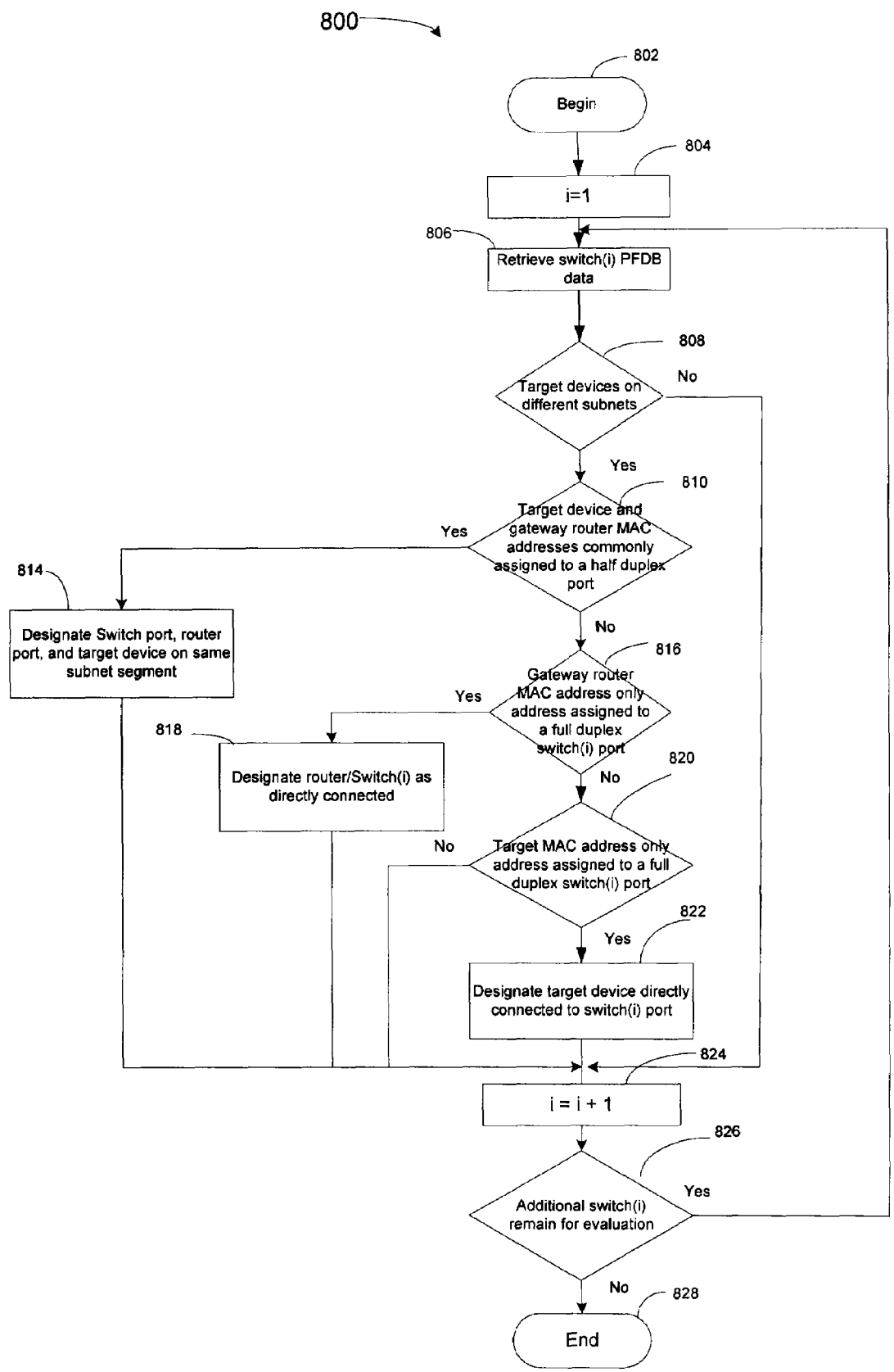
FIG. 8 is a flowchart that depicts an embodiment of a switch ordering module of a diagnostics application.

FIG. 8 is a flowchart 800 that depicts processing steps of an embodiment of a switch ordering module 155e of diagnostics application 155. Switch ordering module 155e preferably includes a diagnostic rules engine that performs the functions of FIG. 8. The diagnostic rules engine may wait for all possibilities or processing depicted and described in FIG. 6 and FIG. 7 to complete before proceeding. At step 802, the switch ordering module is invoked, and a switch index variable i may be initialized at step 804. PFDB data of switch(i), for example PFDB data collected in one or more of the steps depicted in FIG. 6, is retrieved at step 806, and an evaluation of the retrieved PFDB data is made to determine if the target devices are located on different subnets at step 808. In the event that the target devices are located on different subnets, an evaluation may be made to determine if a MAC address of one of the target devices and the MAC address of an associated gateway router are assigned to a common half duplex switch port at step 810. In the event that a MAC address of one of the target devices and a MAC address of an associated gateway router are assigned to a common half duplex switch port, the switch ordering module may designate the switch port, the router port, and the target device as configured on a common subnet segment at step 814. Additionally, the switch can be determined to be the only switch in the layer 2 path trace in the event the egress/ingress ports are the same. The switch ordering module processing may then proceed to increment the switch index variable according to step 824.

Returning again to step 810, in the event the MAC addresses of the target device and the gateway router are not evaluated as commonly assigned to a half duplex port, an evaluation may be made, at step 816, to determine if a MAC address of a gateway router is the only MAC address assigned to a full duplex switch port of switch(i). In the event the MAC address of the gateway router is the only address assigned to a full duplex switch port of switch(i), the router and switch port of switch(i) may be designated as directly connected at step 818.

Returning again to step 816, if the MAC address of the gateway router is not evaluated as the only address assigned to a full duplex port of switch(i), an evaluation may be made to determine if the MAC address of one of the target devices is the only address assigned to a full duplex switch port at step 820. If the MAC address of one of the target devices is not evaluated as the only address assigned to a full duplex switch port, the routine may proceed to increment the switch index variable according to step 824. If the MAC address of one of the target devices is evaluated as the only address assigned to a full duplex switch port at step 820, the target device may be designated as directly connected to the port of switch(i) at step 822, and processing may proceed to increment the switch index variable according to step 824. Once the switch index variable is incremented at step 824, the switch ordering module may proceed to evaluate whether an additional switch(i) remains for evaluation at step 826. In the event that another switch(i) remains for evaluation, the switch ordering module may return to retrieve the switch(i) PFDB data according to step 806. When all switches have been evaluated, the switch ordering module cycle may end according to step 828.

Figure 9:
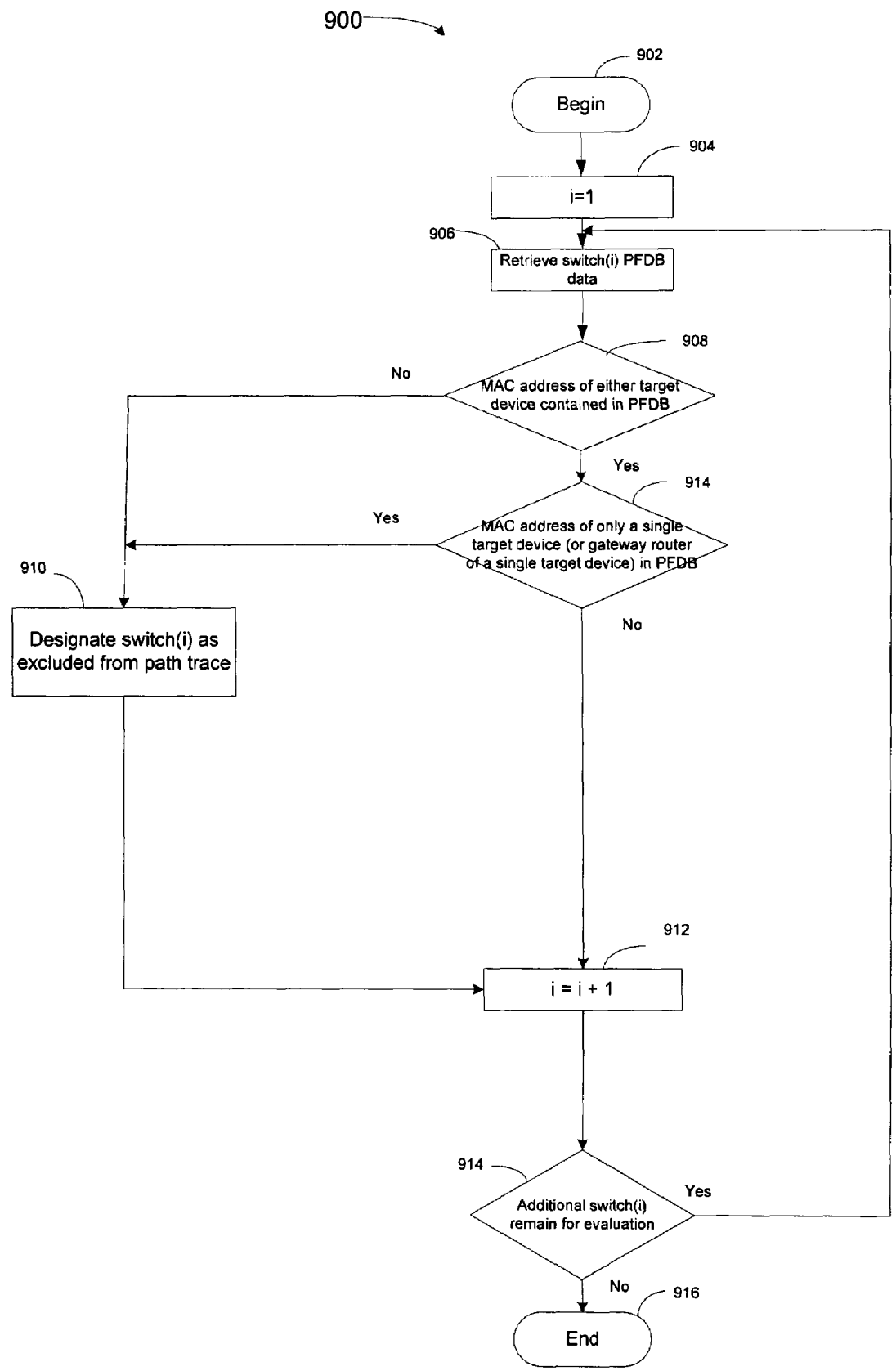
FIG. 9 is a flowchart that depicts an embodiment of a switch ordering module for designating a layer 2 switch as excluded from a path trace.

FIG. 9 is a flowchart 900 that depicts processing steps of embodiment of switch ordering module 155e for designating a layer 2 device as excluded from a path trace between two target devices. At step 902, the switch ordering module is invoked, and a switch index variable i may be initialized at step 904. PFDB data of switch(i), for example PFDB data collected in one or more of the steps depicted in FIG. 6, is retrieved at step 906, and an evaluation of the retrieved PFDB data is made to determine if the retrieved PFDB data contains the MAC address of either target device at step 908. If the PFDB of switch(i) does not contain the MAC address of either target device, switch(i) may be designated as excluded from the path trace at step 910, and the module may proceed to increment the switch index variable at step 912.

Returning again to step 908, in the event that the MAC address of at least one target device is contained in the PFDB of switch(i), an evaluation may be made to determine if the MAC address of only a single target device, or a gateway router of a single target device, is contained in the PFDB of switch(i) at step 914. If the MAC address of only a single target device, or a gateway router associated therewith, is evaluated as included in the PFDB of switch(i), the switch(i) may be designated as excluded from the path trace according to step 910. If the MAC address of a target device is not evaluated as the only target device MAC address included in the PFDB of switch(i), the switch ordering module may proceed to increment the switch index variable according to step 912. Processing may then proceed to evaluate whether an additional switch(i) remains for evaluation at step 914. If an additional switch(i) remains for evaluation, the switch ordering module may return to retrieve switch PFDB information according to step 906. Otherwise, the switch ordering module cycle may exit according to step 916.

In some instances, user configuration data may be provided that defines device connectivity for one or more devices. In such a scenario, one or more processing steps depicted in FIGS. 8 and 9 may be excluded for evaluation of a device for which user configuration data is known.

Figure 10A:
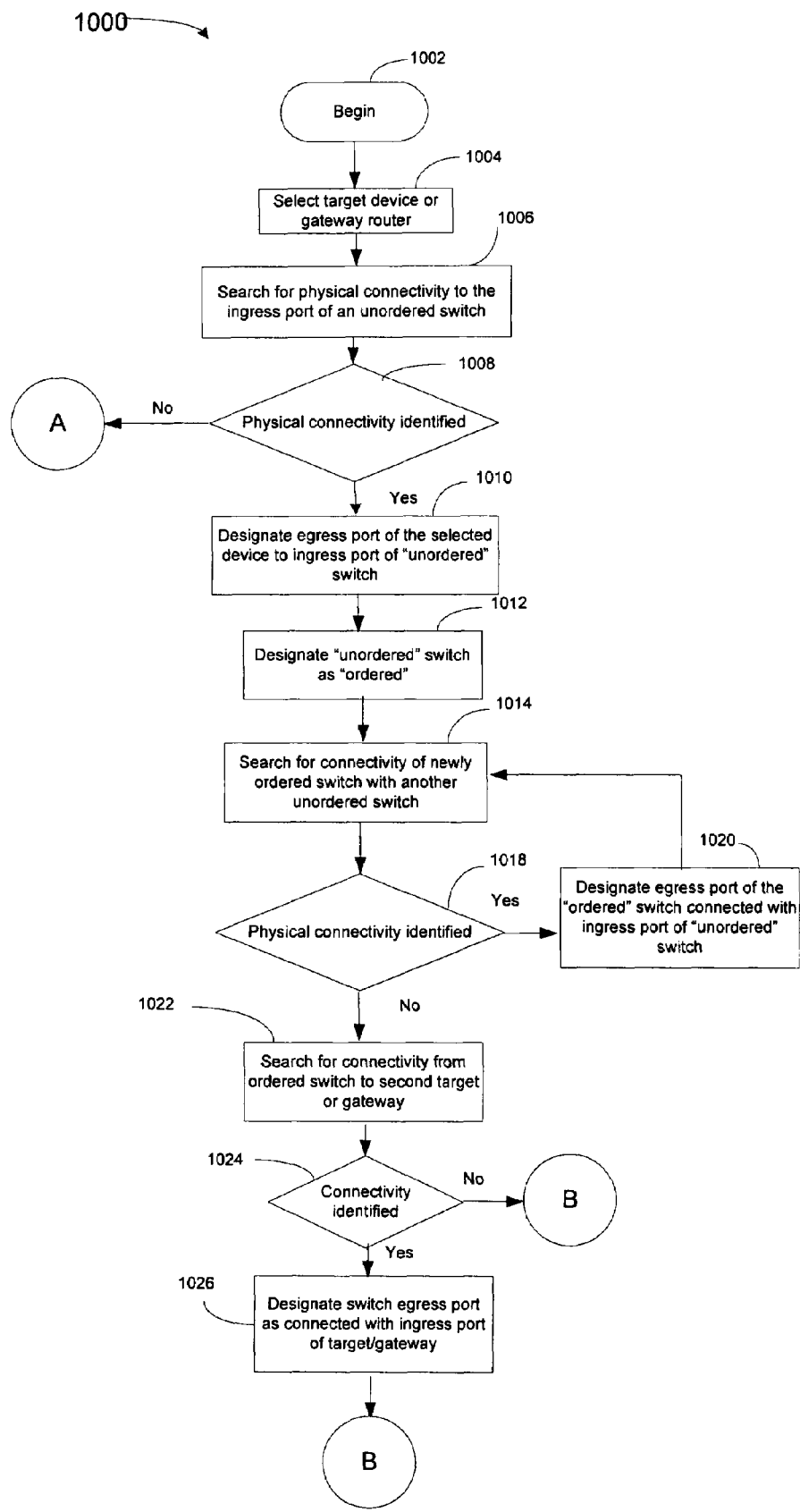
FIGS. 10A and 10B show a flowchart that depicts an embodiment of a layer 2 path assembly module.
Figure 10B:
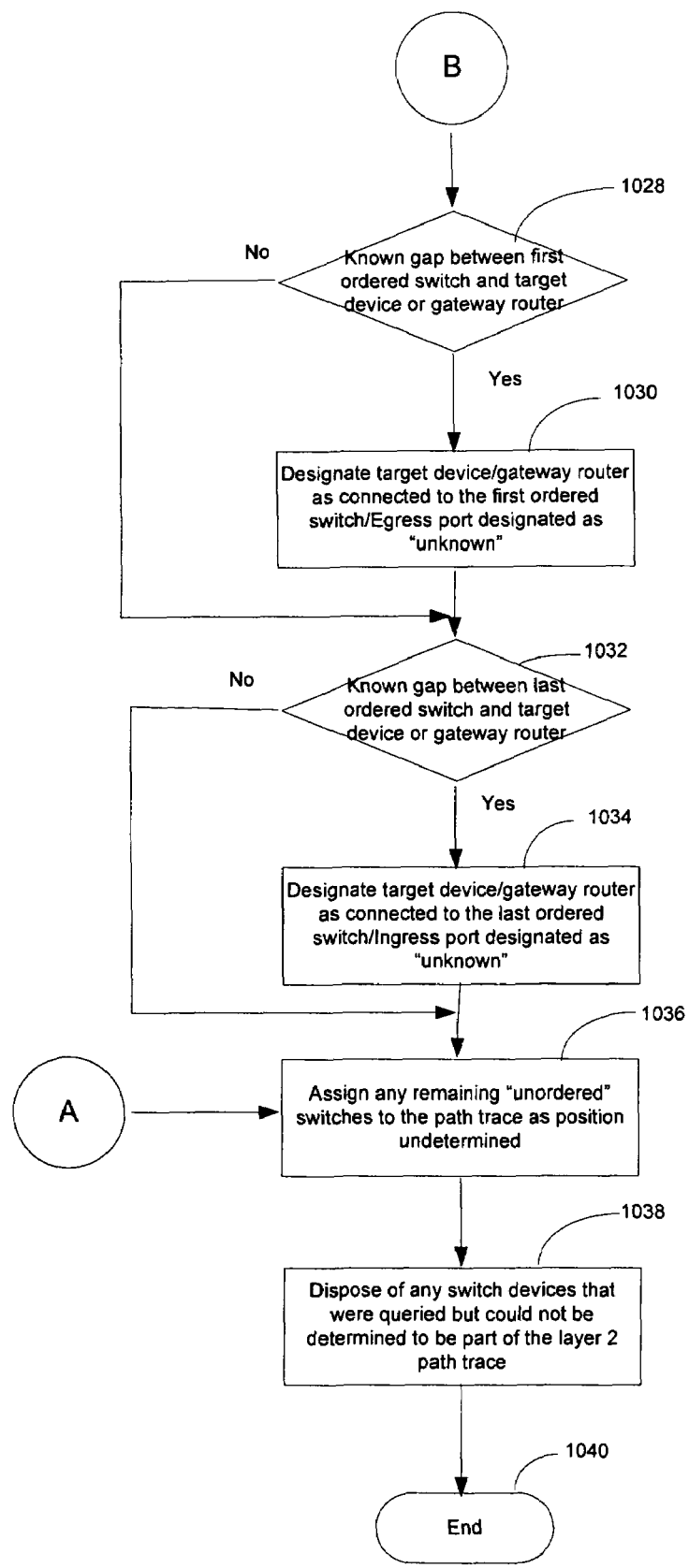

FIGS. 10A and 10B are a flowchart depicting processing steps of an embodiment of a layer 2 path trace assembly module. The layer 2 path trace assembly module is invoked at step 1002, and a target device or gateway router is selected at step 1004. A search is then made to determine if the selected device has physical connectivity with an ingress port of an "unordered" switch at step 1006, and an evaluation is made to determine if such connectivity is identified at step 1008. In the event that physical connectivity is not identified in step 1008, processing may proceed to step 1036. In the event that physical connectivity is identified at step 1008, the egress port of the selected device is designated as connected with an ingress port of the unordered switch at step 1010. The switch may then be designated as ordered at step 1012, and a search is performed for physical connectivity between the newly ordered switch and another unordered switch at step 1014. An evaluation may then be made to determine if connectivity has been identified with the ordered and unordered switches at step 1018. If physical connectivity is identified, the egress port of the ordered switch may be designated as connected with the ingress port of the unordered switch at step 1020 and processing may return to step 1014.

In the event that no physical connectivity is identified at step 1018, a search may be made for connectivity between the ordered switch and the second target device or gateway router at step 1022. An evaluation may then be made to determine if physical connectivity has been identified at step 1024. If physical connectivity is identified, the switch egress port may be designated as connected with the ingress port of the second target device or gateway router at step 1026, and processing may proceed to evaluate whether a known gap exists between the first ordered switch and target device or gateway router at step 1028. In the event that no physical connectivity is identified at step 1024, processing may proceed to step 1028.

If it is determined that a gap exists between the first ordered switch and target device or gateway router, the target device/gateway router may be designated as connected to the first ordered switch/egress port designated as "unknown" at step 1030, and processing may proceed to evaluate whether there is a known gap between the last ordered switch and target device or gateway router at step 1032. If it is determined at step 1032 that a gap exists, the target device or gateway router may be designated as connected to the last ordered switch/ingress port designated as unknown.

Any remaining unordered switches may then be assigned to the path trace as position undetermined at step 1036, and any switch devices that were queried but could not be determined to be part of the layer 2 path trace may be designated as excluded from the path trace or otherwise designated as undetermined at step 1038. Processing may then end according to step 1040.

The processing sequences described in FIGS. 4-10B are provided for illustrative purposes only and are not intended to denote serialization of the described processing steps. In various embodiments, the processing steps described in FIGS. 4-10B may be performed in varying order and may be performed concurrently. Execution of some processing steps of FIG. 4-10B may be excluded without departing from embodiments disclosed herein.

Figure 11:
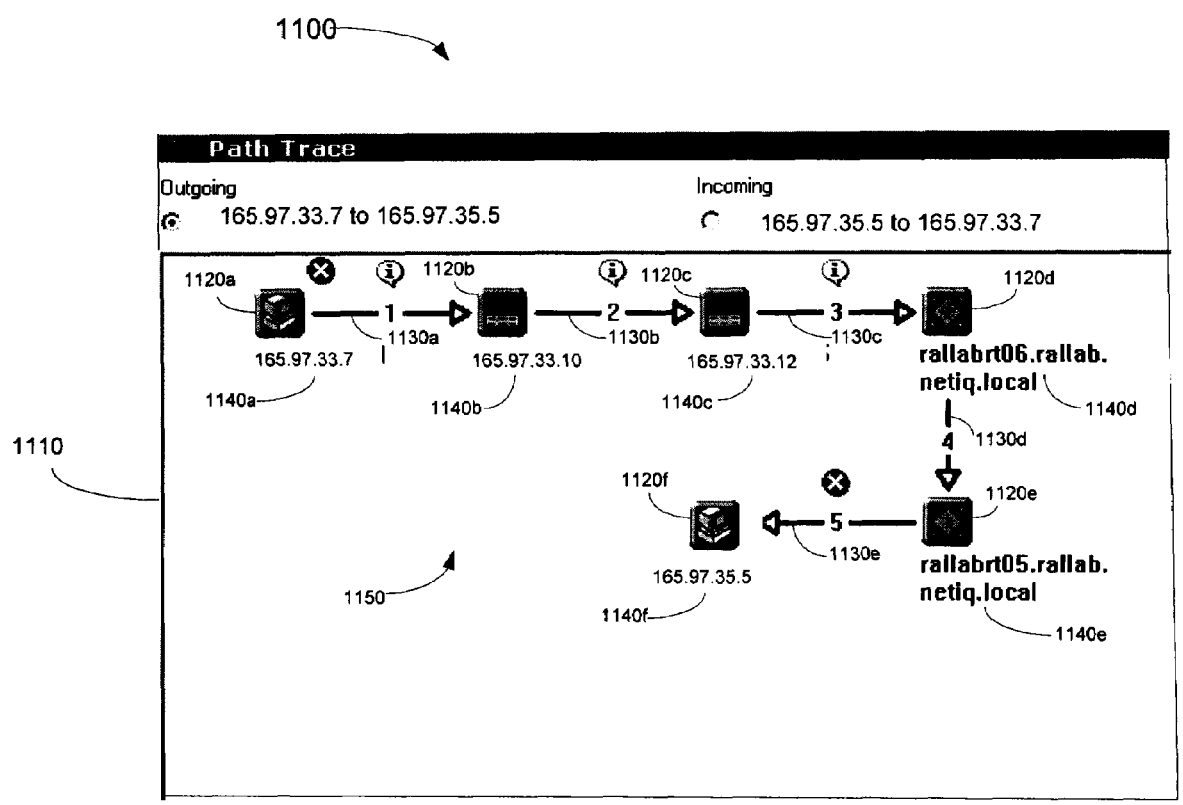
FIG. 11 is a diagrammatic illustration of an embodiment of an exemplary display output of a path trace.

FIG. 11 is a diagrammatic illustration of an embodiment of an exemplary graphical display output of a path trace. A path trace representation may be provided in a graphical user interface 1100 of diagnostics application 155. In the illustrative example, graphical user interface 1100 includes an output panel 1110 in which a path trace 1150 is displayed. Path trace 1150 comprises various graphical objects representative of target devices, network nodes, such as routers, switches, hubs, bridges, and the like, and connectivity indicators. The present example is representative of a path trace that may be generated for target devices specified as VoIP terminals 140*a* and 140*c* in FIG. 1. Target device objects 1120*a* and 1120*f* are representative of VoIP terminals 140*a* and 140*c*. Each target device object 1120*a* and 1120*f* may be displayed in association with identifiers 1140*a* and 1140*f* that provide an identification of the particular target devices displayed. In the present example, identifiers 1140*a* and 1140*f* comprise IP addresses of respective target device terminals 140*a* and 140*c*. Network device objects 1120*b*-1120*e* are respectively representative of a network device, such as a switch, router, or other network component. Each of network device objects 1120*b*-1120*e* may be displayed in association with a respective identifier 1140*b*-1140*e*, such as an IP address, node name, or other suitable identifying information, that provides an identity of the network component which device objects 1120*b*-1120*e* represent. Additionally, path trace 1150 includes connectivity objects 1130*a*-1130*e* that provide a visual indication of node connectivity. For example, connectivity object 1130*a* indicates a physical connection exists between the network entities represented by device object 1120*a* and device object 1120*b*. Thus, path trace 1150 provides a visual representation of a layer 2 path trace between two specified target devices. In this particular example, only one layer 2 path trace between devices represented by device object 1120*a* and a gateway represented by device object 1120*d* is shown in path trace 1150. The remaining portion of path trace 1150 comprises a layer 3 path. Although not shown in this example, a layer 2 path trace could also be performed for each of the other Layer 3 hops represented by connectivity objects 1130*d* and 1130*e*. Path trace 1150 may be generated from a data structure, such as a flat file of expert system facts, e.g., in CLIPS-like notation, although other data structures may be suitably substituted therefore.

Figure 12:
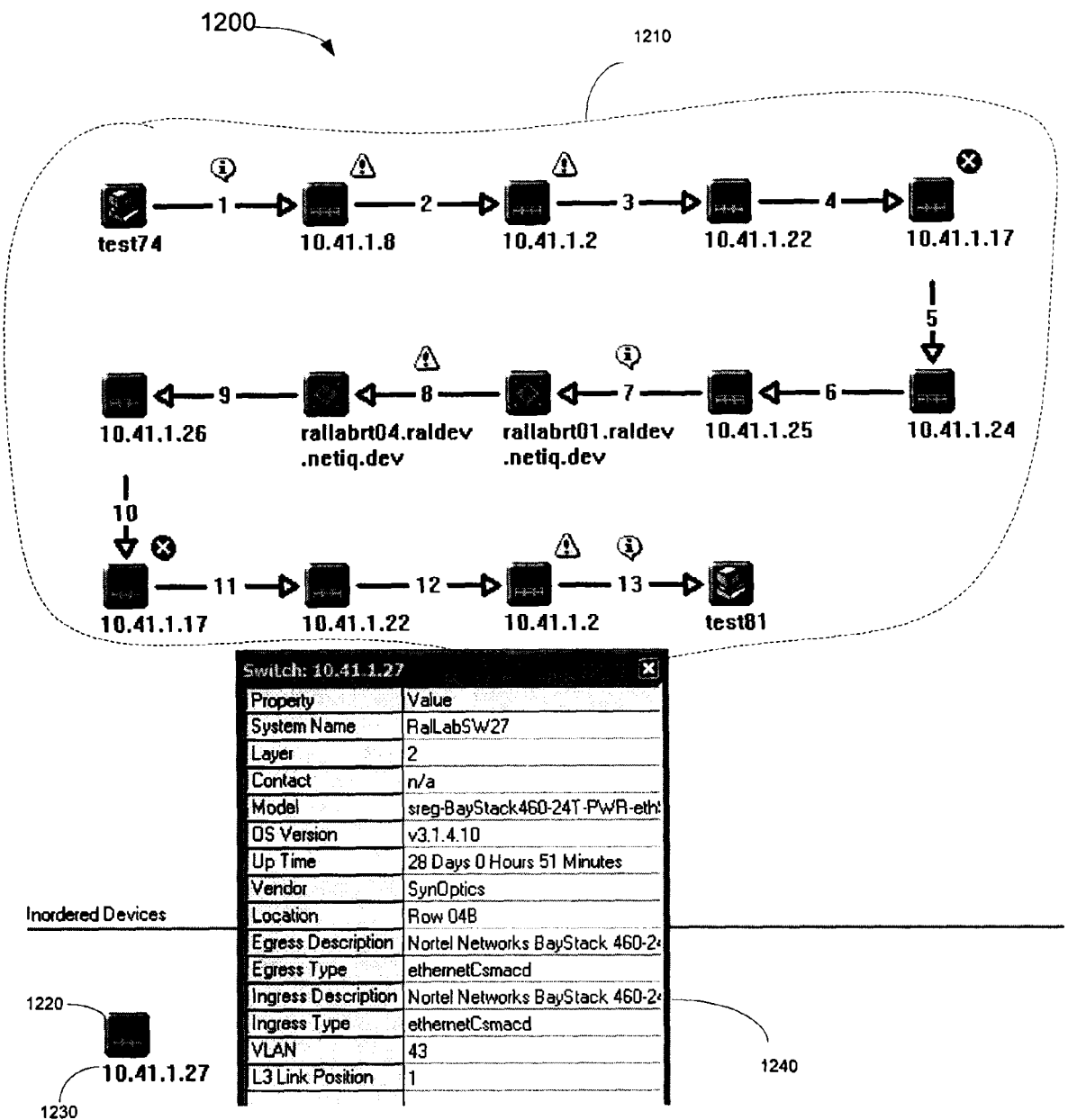
FIG. 12 is a diagrammatic illustration of an embodiment of an exemplary display output of a path trace that includes an unordered node.

FIG. 12 is a diagrammatic illustration of an embodiment of an exemplary display output of a path trace that includes an unordered node. A path trace representation may be provided in a graphical user interface of diagnostics application 155. In the illustrative example, a path trace includes ordered nodes 1210 represented by various device objects in association with connectivity indicators and node identifiers. Additionally, a device object 1220 representative of an unordered node is displayed in association with a device identifier 1230. Various attributes of the unordered node may be provided, for example in a supplementary panel 1240. For example, supplementary panel 1140 includes a layer 3 link position field having a value of "1". This indicates that the unordered device goes somewhere in Layer 3 Link 1 in the path trace displayed above.

As described, a method of performing network system diagnostics is provided. A respective identification of a first target device and a second target device deployed in a network is obtained. Neighbor devices of at least one node in a communications path between the first and second target devices are iteratively queried. A layer 2 path trace that includes identification of network devices interconnected on a physical path between the first and second target devices is generated. A computer-readable medium having computer-executable instructions for execution by a processing system for performing diagnostics in a network system is provided. The computer-readable medium includes instructions that obtain a respective identification of a first target device and a second target device deployed in a network, instructions that iteratively query neighbor devices of at least one node in a communications path between the first and second target devices, and instructions that generate a layer 2 path trace that includes network devices interconnected on a physical path between the first and second target devices. A network diagnostics system is provided. The system comprises means for obtaining a respective identification of a first target device and a second target device deployed in a network, means for iteratively querying neighbor devices of at least one node in a communications path between the first and second target devices, and means for generating a layer 2 path trace that includes network devices interconnected on a physical path between the first and second target devices. A system for performing network diagnostics is provided. First and second nodes are interconnected within a network system. A data processing system including a processor device for executing a diagnostics engine implemented as a set of computer-executable instructions obtains a respective identification of a first target device and a second target device deployed in a network, queries neighbor devices of at least one node in a communications path between the first and second target devices, and generates a layer 2 path trace that includes identifications of network devices interconnected on a physical path between the first and second target devices.

In accordance with an embodiment, a method of performing network system diagnostics is provided. A respective identification of a first target device and a second target device deployed in a network is obtained. Neighbor devices of at least one node in a communications path between the first and second target devices are iteratively queried. The neighbor devices and the first and second target device may comprise heterogeneous network nodes. A layer 2 path trace that comprises identification of network devices interconnected on a physical path between the first and second target devices is generated. The generated layer 2 path trace may comprise an identification of at least one node as an ordered node in the path trace. The generated layer 2 path trace may comprise identification at least one node as an unordered node in the path trace. A graphical representation of the path trace that comprises a respective object for each of the first and second target devices and any nodes identified as included in the physical path may be displayed. The graphical representation of the path trace may include display of one or more nodes identified as unordered in a graphically distinct manner from those identified as ordered.

In accordance with another embodiment, a computer-readable medium having computer-executable instructions for execution by a processing system for performing diagnostics in a network system is provided. The computer-readable medium includes instructions that obtain a respective identification of a first target device and a second target device deployed in a network, instructions that iteratively query neighbor devices of at least one node in a communications path between the first and second target devices, wherein the neighbor devices and the first and second target device may comprise heterogeneous network nodes, and instructions that generate a layer 2 path trace that comprises network devices interconnected on a physical path between the first and second target devices. The instructions that generate the layer 2 path trace may identify at least one node as an ordered node in the path trace. The instructions that generate the layer 2 path trace may identify at least one node as an unordered node in the path trace. The computer-readable medium may further comprise instructions that display a graphical representation of the path trace that comprises a respective object for each of the first and second target devices and any nodes identified as included in the physical path. The instructions that display the graphical representation may further display a node identified as unordered distinctly from the path trace to visually indicate identification of the node as unordered.

In accordance with another embodiment, a network diagnostics system is provided. The system may include means for obtaining a respective identification of a first target device and a second target device deployed in a network, means for iteratively querying neighbor devices of at least one node in a communications path between the first and second target devices, wherein the neighbor devices and the first and second target device may comprise heterogeneous network nodes, and means for generating a layer 2 path trace that comprises network devices interconnected on a physical path between the first and second target devices. The means for generating the layer 2 path trace may comprise means for identifying at least one node as an ordered node in the path trace. The means for generating the layer 2 path trace comprise means for identifying at least one node as an unordered node in the path trace. The system may further comprise means for displaying a graphical representation of the path trace that comprises a respective object for each of the first and second target devices and any nodes identified as included in the physical path. The means for displaying the graphical representation may further comprise means for displaying a node identified as unordered distinctly from the path trace to visually indicate identification of the node as unordered.

In accordance with another embodiment, a system for performing network diagnostics is provided that comprises first and second nodes interconnected within a network system, and a data processing system that includes a processor device for executing a diagnostics engine implemented as a set of computer-executable instructions. The data processing system may be adapted to obtain a respective identification of a first target device and a second target device deployed in a network, query neighbor devices comprising at least one node in a communications path between the first and second target devices, and generate a layer 2 path trace that comprises identifications of network devices interconnected on a physical path between the first and second target devices. The neighbor devices and the first and second target device may comprise heterogeneous network nodes. The system may further comprise a display apparatus connected with the data processing system for visual output of the path trace thereon. The data processing system may generate the layer 2 path trace including an identity of at least one node as an ordered node in the path trace. The data processing system may also generate the layer 2 path trace including an identity of at least one node as an unordered node in the path trace. The data processing system may display a node identified as unordered node distinctly from the path trace to visually indicate identification of the node as unordered. The diagnostics engine may comprise a CLIPS-based Expert System.

In accordance with another embodiment, a method of performing network system diagnostics is provided. A respective identity of a first target device and a second target device deployed in a network is received. A respective port forwarding database on one or more layer 2 devices located between the first target device and the second target device is populated. The respective port forwarding database is queried. One or more of the layer 2 devices are designated as included in a layer 2 path trace between the first and second target devices or excluded from the layer 2 path trace based, at least in part, on the respective port forwarding database. A port forwarding database of a layer 2 device designated as included in the layer 2 path trace is evaluated. An attempt to determine node ordering information specifying direct connectivity between the layer 2 device designated as included in the layer 2 path trace and at last one neighbor device thereof is made. The steps of evaluating and attempting are iteratively repeated with other layer 2 devices designated as included in the layer 2 path trace. The node ordering information is assembled into a layer 2 path trace. A graphical representation of the assembled node ordering information is generated.

In accordance with another embodiment, a computer-readable medium having computer-executable instructions for execution by a processing system, the computer-executable instructions for performing diagnostics in a network system is provided. The computer-readable medium includes instructions that receive a respective identity of a first target device and a second target device deployed in a network. Instructions populate a respective port forwarding database on one or more layer 2 devices located between the first target device and the second target device. Instructions query the respective port forwarding database, and instructions designate one or more of the layer 2 devices as included in a layer 2 path trace between the first and second target devices or excluded from the layer 2 path trace based, at least in part, on the respective port forwarding database. Instructions evaluate a port forwarding database of a layer 2 device designated as included in the layer 2 path trace, and instructions attempt to determine node ordering information specifying direct connectivity between the layer 2 device designated as included in the layer 2 path trace and at last one neighbor device thereof. Instructions iteratively repeat the steps of evaluating and attempting with other layer 2 devices designated as included in the layer 2 path trace. Instructions assemble the node ordering information into a layer 2 path trace. Instructions generate a graphical representation of the assembled node ordering information.

A system for performing network diagnostics is provided. The system includes first and second nodes interconnected within a network system. Additionally, the system includes a data processing system including a processor device for executing a diagnostics engine implemented as a set of computer-executable instructions. The data processing system is adapted to receive a respective identity of the first node and the second node, populate a respective port forwarding database on one or more layer 2 devices located between the first and second nodes, query the respective port forwarding database, and designate one or more of the layer 2 devices as included in a layer 2 path trace or excluded from the layer 2 path trace based, at least in part, on the respective port forwarding database. The data processing system is further adapted to evaluate a port forwarding database of a layer 2 device designated as included in the layer 2 path trace, attempt to determine node ordering information specifying direct connectivity between the layer 2 device designated as included in the layer 2 path trace and at last one neighbor device thereof, and iteratively repeat the steps of evaluating and attempting with other layer 2 devices designated as included in the layer 2 path trace. The data processing system then assembles the node ordering information into a layer 2 path trace, and generates a graphical representation of the assembled node ordering information.

In accordance with another embodiment, a network diagnostics system is provided. The diagnostics system includes means for receiving a respective identity of a first target device and a second target device deployed in a network, means for populating a respective port forwarding database on one or more layer 2 devices located between the first target device and the second target device, and means for querying the respective port forwarding database. The system further includes means for designating one or more of the layer 2 devices as included in a layer 2 path trace between the first and second target devices or excluded from the layer 2 path trace based, at least in part, on the respective port forwarding database, means for evaluating a port forwarding database of a layer 2 device designated as included in the layer 2 path trace, and means for attempting to determine node ordering information specifying direct connectivity between the layer 2 device designated as included in the layer 2 path trace and at last one neighbor device thereof. The system further includes means for iteratively repeating the steps of evaluating and attempting with other layer 2 devices designated as included in the layer 2 path trace, means for assembling the node ordering information into a layer 2 path trace, and means for generating a graphical representation of the assembled node ordering information.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

The invention claimed is:

1. A method of performing network system diagnostics, comprising:
   obtaining a respective identification of a first target device and a second target device deployed in a heterogeneous network;
   identifying a layer 2 device and a neighbor device that is communicably coupled to the layer 2 device, wherein the neighbor device and the layer 2 device are deployed in the heterogeneous network;
   obtaining from a port forwarding database (PFDB) maintained by the layer 2 device a MAC address that identifies the neighbor device;
   obtaining from the PFDB maintained by the layer 2 device a port of the layer 2 device, wherein the port is associated with the MAC address;
   determining if the layer 2 device is included in a network path between the first and second target devices by using the neighbor device, the MAC address, and the port;
   defining an order of the layer 2 device within the network path using the neighbor device, the MAC address, and the port;
   generating a first layer 2 path trace using the order of the layer 2 device within the network path;
   generating a second layer 2 path trace using the first layer 2 path trace and user-provided connectivity information related to at least one of the layer 2 device and the neighbor device; and
   displaying a graphical representation of the second layer 2 path trace.

2. The method of claim 1, wherein the first target device is communicably coupled to a layer 3 device deployed in the heterogeneous network, and determining if the layer 2 device is included in the network path comprises:
   obtaining from the PFDB maintained by the layer 2 device:
      a second MAC address that identifies the first target device,
      a third MAC address that identifies the second target device, and
      a fourth MAC address that identifies the layer 3 device; and
   obtaining from the PFDB maintained by the layer 2 device at least one of:
      a second port of the layer 2 device and a third port of the layer 2 device, wherein the second port is associated with the second MAC address, the third port is associated with the third MAC address; and
      the second port of the layer 2 device and a fourth port of the layer 2 device, wherein the fourth port is associated with the fourth MAC address.

3. The method of claim 1, wherein the first target device is deployed in a first subnet located in the heterogeneous network, the first target device is communicably coupled to a layer 3 device deployed in the heterogeneous network, the second target device is deployed in a second subnet located in the heterogeneous network, wherein the first and second subnets are different, and defining the order of the layer 2 device within the network path comprises:

obtaining from the PFDB maintained by the layer 2 device:
- a second MAC address that identifies the first target device,
- a third MAC address that identifies the layer 3 device, and
- a second port of the layer 2 device, wherein the second port is associated with the second MAC address and the third MAC address, and the second port is a half duplex port; and designating in the layer 2 path trace that the layer 2 device, the layer 3 device, and the first target device are located on the first subnet.

4. The method of claim 1, wherein the first target device is communicably coupled to a layer 3 device deployed in the heterogeneous network, and defining the order of the layer 2 device within the network path comprises:

obtaining from the PFDB maintained by the layer 2 device:
- a second MAC address that identifies the layer 3 device, and
- a second port of the layer 2 device, wherein the second port is associated only with the second MAC address, and the second port is a full duplex port; and designating in the layer 2 path trace that the layer 3 device is directly connected to the second port.

5. The method of claim 1, wherein defining the order of the layer 2 device within the network path comprises:

obtaining from the PFDB maintained by the layer 2 device:
- a second MAC address that identifies the first target device, and
- a second port of the layer 2 device, wherein the second port is associated only with the second MAC address, and the second port is a full duplex port; and designating in the layer 2 path trace that the first target device is directly connected to the second port.

6. An apparatus comprising a non-transitory computer-readable medium having computer-executable instructions for execution by a processing system, the computer-executable instructions for performing diagnostics in a network system, wherein the instructions comprise:

instructions that obtain a respective identification of a first target device and a second target device deployed in a heterogeneous network;

instructions that identify a aver 2 device and a neighbor device that is communicably coupled to the aver 2 device, wherein the neighbor device and the aver 2 device are deployed in the heterogeneous network;

instructions that obtain from a port forwarding database (PFDB) maintained by the layer 2 device a MAC address that identifies the neighbor device;

instructions that obtain from the PFDB maintained by the layer 2 device a port of the layer 2 device, wherein the port is associated with the MAC address;

instructions that determine that the layer 2 device is included in a network path between the first and second target devices using the neighbor device, the MAC address, and the port;

instructions that define an order of the layer 2 device within the network path using the neighbor device, the MAC address, and the port;

instructions that generate a first layer 2 path trace of the network path using the order of the layer 2 device within the network path;

instructions that generate a second layer 2 path trace using the first layer 2 path trace and user-provided connectivity information related to at least one of the aver 2 device and the neighbor device; and instructions that display a graphical representation of the second layer 2 path trace.

7. The apparatus of claim 6, wherein the first target device is communicably coupled to a layer 3 device deployed in the heterogeneous network, and the instructions that determine that the layer 2 device is included in the network path comprise:

instructions that obtain from the PFDB maintained by the layer 2 device:
- a second MAC address that identifies the first target device,
- a third MAC address that identifies the second target device, and
- a fourth MAC address that identifies the layer 3 device; and instructions that obtain from the PFDB maintained by the layer 2 device at least one of:
- a second port of the layer 2 device and a third port of the layer 2 device, wherein the second port is associated with the second MAC address, the third port is associated with the third MAC address; and
- the second port of the layer 2 device and a fourth port of the layer 2 device, wherein the fourth port is associated with the fourth MAC address.

8. The apparatus of claim 6, wherein the first target device is deployed in a first subnet located in the heterogeneous network, the first target device is communicably coupled to a layer 3 device deployed in the heterogeneous network, the second target device is deployed in a second subnet located in the heterogeneous network, wherein the first and second subnets are different, and the instructions that define the order of the layer 2 device within the network path comprise:

instructions that obtain from the PFDB maintained by the layer 2 device:
- a second MAC address that identifies the first target device,
- a third MAC address that identifies the layer 3 device, and
- a second port of the layer 2 device, wherein the second port is associated with the second MAC address and the third MAC address, and the second port is a half duplex port; and instructions that designate in the layer 2 path trace that the layer 2 device, the layer 3 device, and the first target device are located on the first subnet.

9. The apparatus of claim 6, wherein the first target device is communicably coupled to a layer 3 device deployed in the heterogeneous network, and the instructions that define the order of the layer 2 device within the network path comprise:

instructions that obtain from the PFDB maintained by the layer 2 device:
- a second MAC address that identifies the layer 3 device, and
- a second port of the layer 2 device, wherein the second port is associated only with the second MAC address, and the second port is a full duplex port; and designating in the layer 2 path trace that the layer 3 device is directly connected to the second port.

10. The apparatus of claim 6, wherein the instructions that define the order of the layer 2 device within the network path comprise:

instructions that obtain from the PFDB maintained by the layer 2 device:

a second MAC address that identifies the first target device, and a second port of the layer 2 device, wherein the second port is associated only with the second MAC address, and the second port is a full duplex port; and instructions that designate in the layer 2 path trace that the first target device is directly connected to the second port.

11. A non-transitory computer-readable medium having computer-executable instructions for execution by a processing system, the computer-executable instructions for performing diagnostics in a network system, the instructions comprising:

instructions that obtain a respective identification of a first target device and a second target device deployed in a heterogeneous network;

instructions that identify a layer 2 device and a neighbor device that is communicably coupled to the layer 2 device, wherein the neighbor device and the layer 2 device are deployed in the heterogeneous network;

instructions that obtain from a port forwarding database (PFDB) maintained by the layer 2 device a MAC address that identifies the neighbor device;

instructions that obtain from the PFDB maintained by the layer 2 device a port of the layer 2 device, wherein the port is associated with the MAC address;

instructions that determine if the layer 2 device is included in a network path between the first and second target devices by using the neighbor device, the MAC address, and the port;

instructions that define an order of the layer 2 device within the network path using the neighbor device, the MAC address, and the port;

instructions that generate a first layer 2 path trace of the network path using the order of the layer 2 device within the network path;

instructions that generate a second layer 2 path trace using the first layer 2 path trace and user-provided connectivity information related to at least one of the layer 2 device and the neighbor device; and instructions that display a graphical representation of the second layer 2 path trace.

12. The computer-readable medium of claim 11, wherein the first target device is communicably coupled to a layer 3 device deployed in the heterogeneous network, and the instructions that determine if the layer 2 device is included in the network path comprise:

instructions that obtain from the PFDB maintained by the layer 2 device:

a second MAC address that identifies the first target device,
a third MAC address that identifies the second target device, and
a fourth MAC address that identifies the layer 3 device; and instructions that obtain from the PFDB maintained by the layer 2 device at least one of:

a second port of the layer 2 device and a third port of the layer 2 device, wherein the second port is associated with the second MAC address, the third port is associated with the third MAC address; and the second port of the layer 2 device and a fourth port of the layer 2 device, wherein the fourth port is associated with the fourth MAC address.

13. The computer-readable medium of claim 11, the first target device is deployed in a first subnet located in the heterogeneous network, the first target device is communicably coupled to a layer 3 device deployed in the heterogeneous network, the second target device is deployed in a second subnet located in the heterogeneous network, wherein the first and second subnets are different, and the instructions that define the order of the layer 2 device within the network path comprise:

instructions that obtain from the PFDB maintained by the layer 2 device:

a second MAC address that identifies the first target device,
a third MAC address that identifies the layer 3 device, and
a second port of the layer 2 device, wherein the second port is associated with the second MAC address and the third MAC address, and the second port is a half duplex port; and instructions that designate in the layer 2 path trace that the layer 2 device, the layer 3 device, and the first target device are located on the first subnet.

14. The computer-readable medium of claim 11, wherein the first target device is communicably coupled to a layer 3 device deployed in the heterogeneous network, and the instructions that define the order of the layer 2 device within the network path comprise:

instructions that obtain from the PFDB maintained by the layer 2 device:

a second MAC address that identifies the layer 3 device, and
a second port of the layer 2 device, wherein the second port is associated only with the second MAC address, and the second port is a full duplex port; and instructions that designate in the layer 2 path trace that the layer 3 device is directly connected to the second port.

15. The computer-readable medium of claim 14, wherein the instructions that define the order of the layer 2 device within the network path comprise:

instructions that obtain from the PFDB maintained by the layer 2 device:

a second MAC address that identifies the first target device, and
a second port of the layer 2 device, wherein the second port is associated only with the second MAC address, and the second port is a full duplex port; and instructions that designate in the layer 2 path trace that the first target device is directly connected to the second port.

16. A method of performing network system diagnostics, comprising:

obtaining a respective identification of a first target device, a second target device, and a layer 3 device that is communicably coupled to the first target device, wherein the first and second target devices and the layer 3 device are deployed in a heterogeneous network;

identifying a layer 2 device and a neighbor device that is communicably coupled to the layer 2 device, wherein the neighbor device and the layer 2 device are deployed in the heterogeneous network;

obtaining from a port forwarding database (PFDB) maintained by the layer 2 device:

a first MAC address that identifies the neighbor device,
a second MAC address that identifies the first target device,
a third MAC address that identifies the second target device, and
a fourth MAC address that identifies the layer 3 device;

obtaining from the PFDB maintained by the layer 2 device a first port of the layer 2 device, wherein the first port is associated with the first MAC address;

determining if the layer 2 device is included in a network path between the first and second target devices upon the occurrence of at least one of the following:

obtaining from the PFDB maintained by the layer 2 device a second port of the layer 2 device and a third port of the layer 2 device, wherein the second port is associated with the second MAC address, and the third port is associated with the third MAC address;

obtaining from the PFDB maintained by the layer 2 device the second port of the layer 2 device and a fourth port of the layer 2 device, wherein the fourth port is associated with the fourth MAC address;

defining an order of the layer 2 device within the network path using the neighbor device, the first MAC address, the second MAC address, the third MAC address, the fourth MAC address, the first port, the second port, the third port, and the fourth port;

generating a layer 2 path trace of the network path using the order of the layer 2 device within the network path; and displaying a graphical representation of the layer 2 path trace.

17. The method of claim 16, wherein the first target device is deployed in a first subnet located in the heterogeneous network, the first target device is communicably coupled to a layer 3 device deployed in the heterogeneous network, the second target device is deployed in a second subnet located in the heterogeneous network, wherein the first and second subnets are different, and defining the order of the layer 2 device within the network path comprises:

obtaining from the PFDB maintained by the layer 2 device:
a second port of the layer 2 device, wherein the second port is associated with the second MAC address and the fourth MAC address, and the second port is a half duplex port; and designating in the layer 2 path trace that the layer 2 device, the layer 3 device, and the first target device are located on the first subnet.

18. The method of claim 16, wherein the first target device is communicably coupled to a layer 3 device deployed in the heterogeneous network, and defining the order of the layer 2 device within the network path comprises:

obtaining from the PFDB maintained by the layer 2 device:
a second port of the layer 2 device, wherein the second port is associated only with the fourth MAC address, and the second port is a full duplex port; and designating in the layer 2 path trace that the layer 3 device is directly connected to the second port.

19. The method of claim 16, wherein defining the order of the layer 2 device within the network path comprises:

obtaining from the PFDB maintained by the layer 2 device:
a second port of the layer 2 device, wherein the second port is associated only with the second MAC address, and the second port is a full duplex port; and designating in the layer 2 path trace that the first target device is directly connected to the second port.

20. An apparatus comprising a non-transitory computer-readable medium having computer-executable instructions for execution by a processing system, the computer-executable instructions for performing diagnostics in a network system, wherein the instructions comprise:

instructions that obtain a respective identification of a first target device, a second target device, and a layer 3 device that is communicably coupled to the first target device, wherein the first and second target devices and the layer 3 device are deployed in a heterogeneous network;

instructions that identify a layer 2 device and a neighbor device that is communicably coupled to the layer 2 device, wherein the neighbor device and the layer 2 device are deployed in the heterogeneous network;

instructions that obtain from a port forwarding database (PFDB) maintained by the layer 2 device:
a first MAC address that identifies the neighbor device,
a second MAC address that identifies the first target device,
a third MAC address that identifies the second target device, and
a fourth MAC address that identifies the layer 3 device;

instructions that obtain from the PFDB maintained by the layer 2 device a first port of the layer 2 device, wherein the first port is associated with the first MAC address;

instructions that determine if the layer 2 device is included in a network path between the first and second target devices, wherein the instructions that determine that the layer 2 device is included in a network path include at least one of the following:

instructions that obtain from the PFDB maintained by the layer 2 device a second port of the layer 2 device and a third port of the layer 2 device, wherein the second port is associated with the second MAC address, and the third port is associated with the third MAC address;

instructions that obtain from the PFDB maintained by the layer 2 device the second port of the layer 2 device and a fourth port of the layer 2 device, wherein the fourth port is associated with the fourth MAC address;

instructions that define an order of the layer 2 device within the network path using the neighbor device, the first MAC address, the second MAC address, the third MAC address, the fourth MAC address, the first port, the second port, the third port, and the fourth port;

instructions that generate a layer 2 path trace of the network path using order of the layer 2 device within the network path; and instructions that display a graphical representation of the layer 2 path trace.

21. The apparatus of claim 20, wherein the first target device is deployed in a first subnet located in the heterogeneous network, the first target device is communicably coupled to a layer 3 device deployed in the heterogeneous network, the second target device is deployed in a second subnet located in the heterogeneous network, wherein the first and second subnets are different, and the instructions that define the order of the layer 2 device within the network path comprise:

instructions that obtain from the PFDB maintained by the layer 2 device:
a second port of the layer 2 device, wherein the second port is associated with the second MAC address and the fourth MAC address, and the second port is a half duplex port; and instructions that designate in the layer 2 path trace that the layer 2 device, the layer 3 device, and the first target device are located on the first subnet.

22. The apparatus of claim 20, wherein the first target device is communicably coupled to a layer 3 device deployed in the heterogeneous network, and instructions that define the order of the layer 2 device within the network path comprise:

instructions that obtain from the PFDB maintained by the layer 2 device:
a second port of the layer 2 device, wherein the second port is associated only with the fourth MAC address, and the second port is a full duplex port; and instructions that designate in the layer 2 path trace that the layer 3 device is directly connected to the second port.

23. The apparatus of claim 20, wherein instructions that define the order of the layer 2 device within the network path comprise:

instructions that obtain from the PFDB maintained by the layer 2 device:
a second port of the layer 2 device, wherein the second port is associated only with the second MAC address, and the second port is a full duplex port; and
instructions that designate in the layer 2 path trace that the first target device is directly connected to the second port.

24. A non-transitory computer-readable medium having computer-executable instructions for execution by a processing system, the computer-executable instructions for performing diagnostics in a network system, the instructions comprising:
instructions that obtain a respective identification of a first target device, a second target device, and a layer 3 device that is communicably coupled to the first target device, wherein the first and second target devices and the layer 3 device are deployed in a heterogeneous network;
instructions that identify a layer 2 device and a neighbor device that is communicably coupled to the layer 2 device, wherein the neighbor device and the layer 2 device are deployed in the heterogeneous network;
instructions that obtain from a port forwarding database (PFDB) maintained by the layer 2 device:
a first MAC address that identifies the neighbor device,
a second MAC address that identifies the first target device,
a third MAC address that identifies the second target device, and
a fourth MAC address that identifies the layer 3 device;
instructions that obtain from the PFDB maintained by the layer 2 device a first port of the layer 2 device, wherein the first port is associated with the first MAC address;
instructions that determine if the layer 2 device is included in a network path between the first and second target devices that includes at least one of the following:
instructions that obtain from the PFDB maintained by the layer 2 device a second port of the layer 2 device and a third port of the layer 2 device, wherein the second port is associated with the second MAC address, and the third port is associated with the third MAC address;
instructions that obtain from the PFDB maintained by the layer 2 device the second port of the layer 2 device and a fourth port of the layer 2 device, wherein the fourth port is associated with the fourth MAC address;
instructions that define an order of the layer 2 device within the network path using the neighbor device, the first MAC address, the second MAC address, the third MAC address, the fourth MAC address, the first port, the second port, the third port, and the fourth port;
instructions that generate a layer 2 path trace of the network path using the order of the layer 2 device within the network path; and
instructions that display a graphical representation of the layer 2 path trace.

25. The computer-readable medium of claim 24, wherein the first target device is deployed in a first subnet located in the heterogeneous network, the first target device is communicably coupled to a layer 3 device deployed in the heterogeneous network, the second target device is deployed in a second subnet located in the heterogeneous network, wherein the first and second subnets are different, and the instructions that define the order of the layer 2 device within the network path comprise:
instructions that obtain from the PFDB maintained by the layer 2 device:
a second port of the layer 2 device, wherein the second port is associated with the second MAC address and the fourth MAC address, and the second port is a half duplex port; and
instructions that designate in the layer 2 path trace that the layer 2 device, the layer 3 device, and the first target device are located on the first subnet.

26. The computer-readable medium of claim 24, wherein the first target device is communicably coupled to a layer 3 device deployed in the heterogeneous network, and the instructions that define the order of the layer 2 device within the network path comprise:
instructions that obtain from the PFDB maintained by the layer 2 device:
a second port of the layer 2 device, wherein the second port is associated only with the fourth MAC address, and the second port is a full duplex port; and
instructions that designate in the layer 2 path trace that the layer 3 device is directly connected to the second port.

27. The computer-readable medium of claim 24, wherein the instructions that define the order of the layer 2 device within the network path comprises:
instructions that obtain from the PFDB maintained by the layer 2 device:
a second port of the layer 2 device, wherein the second port is associated only with the second MAC address, and the second port is a full duplex port; and
instructions that designate in the layer 2 path trace that the first target device is directly connected to the second port.

* * * * *